US009010909B2

(12) United States Patent
Nelson et al.

(10) Patent No.: US 9,010,909 B2
(45) Date of Patent: Apr. 21, 2015

(54) CONTINUOUS INKJET PRINTING METHOD

(75) Inventors: David John Nelson, Rochester, NY (US); Brian L Lindstrom, Victor, NY (US); Alexandra DiLauro Bermel, Pittsford, NY (US); Allan Francis Sowinski, Rochester, NY (US); David Louis Jeanmaire, Brockport, NY (US); Todd Russell Griffin, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 130 days.

(21) Appl. No.: 13/234,745

(22) Filed: Sep. 16, 2011

(65) Prior Publication Data
US 2013/0070031 A1    Mar. 21, 2013

(51) Int. Cl.
*B41J 2/02* (2006.01)
*G01D 11/00* (2006.01)
*B41J 2/105* (2006.01)
*C09D 11/324* (2014.01)
*C09D 11/38* (2014.01)
*C09D 11/40* (2014.01)

(52) U.S. Cl.
CPC .............. *B41J 2/105* (2013.01); *C09D 11/324* (2013.01); *C09D 11/38* (2013.01); *C09D 11/40* (2013.01)

(58) Field of Classification Search
CPC ...... B41J 2/02; B41J 2002/02; B41J 2002/03; B41J 2002/031; B41J 2002/032; B41J 2002/033; B41J 2002/1853; C09D 11/30
USPC ....................... 347/84, 85, 93, 73, 90, 95, 100
See application file for complete search history.

(56) References Cited

U.S. PATENT DOCUMENTS

| 5,870,124 | A  | * | 2/1999 | Silverbrook ................... 347/85 |
| 5,933,171 | A  | * | 8/1999 | Komatsu ........................ 347/75 |
| 6,441,774 | B1 | * | 8/2002 | Pond ............................ 342/100 |
| 6,554,410 | B2 |   | 4/2003 | Jeanmaire et al. |
| 6,588,888 | B2 |   | 7/2003 | Jeanmaire et al. |

(Continued)

FOREIGN PATENT DOCUMENTS

JP    2003231838 A  *  8/2003
WO  WO 2011076703 A1 *  6/2011

OTHER PUBLICATIONS

JP 2003231838 A, English Machine-Translation, date of translation May 22, 2014.*

*Primary Examiner* — Matthew Luu
*Assistant Examiner* — Patrick King
(74) *Attorney, Agent, or Firm* — Andrew J. Anderson; Raymond L. Owens

(57) ABSTRACT

A method of printing an image with a continuous inkjet printer system employing a jetting module including a nozzle in fluid communication with a liquid ink source and a catcher including a liquid drop contact face; wherein the liquid ink is an aqueous inkjet black ink comprising a black colorant and at least one surfactant selected to provide a 10-ms dynamic surface tension of less than 54 mN/m. Full color images may be printed by further employing at least second, third and fourth jetting modules and yellow, magenta and cyan inks each also comprising a surfactant selected to provide a 10-ms dynamic surface tension of less than 54 mN/m for each ink. The ink compositions provide for fluid properties on the drop catcher face that minimize printing defects that can occur during drop deflection during the printing of high dynamic range images at high speed.

20 Claims, 5 Drawing Sheets

(56) References Cited

U.S. PATENT DOCUMENTS

| | | | |
|---|---|---|---|
| 6,695,443 B2* | 2/2004 | Arita et al. | 347/100 |
| 6,863,385 B2 | 3/2005 | Jeanmarie et al. | |
| 6,866,370 B2 | 3/2005 | Jeanmaire | |
| 7,037,362 B2* | 5/2006 | Honma et al. | 106/31.13 |
| 7,429,293 B2 | 9/2008 | Cai | |
| 7,494,966 B2* | 2/2009 | Noerenberg et al. | 510/421 |
| 7,669,988 B2* | 3/2010 | Sharma et al. | 347/77 |
| 7,682,002 B2 | 3/2010 | Brost et al. | |
| 7,766,471 B2 | 8/2010 | Kato et al. | |
| 7,946,691 B2 | 5/2011 | Griffin et al. | |
| 8,646,901 B2* | 2/2014 | De Meutter et al. | 347/102 |
| 2002/0122103 A1 | 9/2002 | Yamamoto et al. | 347/85 |
| 2003/0107632 A1* | 6/2003 | Arita et al. | 347/100 |
| 2003/0144465 A1* | 7/2003 | Leenders et al. | 528/373 |
| 2004/0011248 A1 | 1/2004 | Taguchi et al. | |
| 2004/0099182 A1 | 5/2004 | Kamoto et al. | |
| 2005/0166794 A1 | 8/2005 | Bauer | |
| 2006/0139416 A1* | 6/2006 | Nakazawa | 347/77 |
| 2006/0176349 A1* | 8/2006 | Nagai et al. | 347/100 |
| 2006/0238588 A1 | 10/2006 | Lee et al. | |
| 2007/0013750 A1* | 1/2007 | Furukawa | 347/78 |
| 2007/0043144 A1 | 2/2007 | House et al. | |
| 2007/0186812 A1 | 8/2007 | Koga et al. | |
| 2007/0283845 A1 | 12/2007 | Mizusaki et al. | |
| 2008/0171148 A1 | 7/2008 | Tonishi et al. | |
| 2008/0207805 A1* | 8/2008 | Blease et al. | 524/145 |
| 2008/0278552 A1* | 11/2008 | Sanada et al. | 347/85 |
| 2008/0280042 A1* | 11/2008 | Yanagimachi et al. | 427/256 |
| 2008/0280044 A1 | 11/2008 | Okamura et al. | |
| 2009/0169761 A1 | 7/2009 | Szajewski et al. | |
| 2009/0169762 A1 | 7/2009 | Szajewski et al. | |
| 2009/0202723 A1 | 8/2009 | Ikoshi et al. | |

* cited by examiner

CONTINUOUS INKJET PRINTING METHOD

CROSS REFERENCE TO RELATED APPLICATIONS

Reference is also made to commonly assigned, co-pending U.S. Ser. No. 13/234,695, entitled "Ink Set for Continuous Inkjet Printing" and U.S. Ser. No. 13/234,662, entitled "Ink Composition for Continuous Inkjet Printing", both filed concurrently herewith Sep. 16, 2011, the disclosures of which are incorporated herein by reference.

FIELD OF THE INVENTION

The invention relates generally to the field of inkjet inks, and in particular to aqueous pigmented ink compositions for continuous inkjet printing. More specifically, the invention relates to black inkjet inks and full colored inkjet ink sets with dynamic surface tension properties especially suitable for high speed continuous inkjet printing.

BACKGROUND OF THE INVENTION

In one form of binary continuous inkjet (CIJ) printing, such as described in U.S. Pat. Nos. 6,554,410; 6,588,888; 6,863,385; and 6,866,370, a printhead produces fluid drops by thermal stimulation of the fluid jet of inkjet ink using ring heaters surrounding the nozzle orifice that initiate pinch-off of the fluid ligament and its induced reorganization into a spherical drop during flight. Unlike electrostatic deflection CIJ, the drops are not monodisperse, and two populations of relatively large drops and relatively smaller drops are intentionally produced. Typically, the large drops are employed as printing drops and the small drops are non-printing drops. Additional droplet types undesirably can form, including satellites and coalesced small non-printing drops. In one useful implementation, the volume of a large printing drop is threefold or fourfold that of a normal small non-printing drop; undesired merged non-printing drops (or catch drops) are 2× in volume. Printing and non-printing drops of ink are selected for marking the substrate and return to the ink tank, respectively, by means air deflection steering of the drop stream towards a catcher surface or gutter. Lateral direction of an air stream at the fluid droplet stream in flight imparts orthogonal momentum to the drops that succeeds in driving the non-printing drops to impact the gutter during a critical segment of the flight, but does not drive the printing drops quite so far, and their flight continues until they impact the substrate being printed. Understandably, the air flow must be carefully adjusted to accurately select between the drop populations, and apparatus for providing controlled gas flow is described in the above referenced patents and further, e.g., in U.S. Pat. Nos. 7,682,002 and 7,946,691. If the air flow is insufficient, such that small non-printing drops are not deflected far enough, they can reach the substrate being printed and a marking error of unintended printing occurs that is referred to as "dark defect" (DD), reducing print quality. If the air flow is too aggressive, large printing drops may also be swept into the gutter and not mark the substrate at all, creating another marking error due to the incomplete print image that is referred to as "pick out" (PO). The difference in the air flow settings (e.g., volumetric flow rate, or differential pressure) between the onsets of the two printing defects is referred to as "operating window," "printing window," "operating margin" or "printing margin", or simply "print margin" or "print window." It is always desirable to enlarge the print window in order to maximize the robustness of the printing process.

Operating settings of air flow through positive and negative ducts of the air deflection manifold are typically chosen by printing a test image, and then varying the air flow for each individual jetting module of a line head until it resides within the operating window between the onsets of the two defects. The problem arises, however, that the print margin in a CIJ printing press is both sensitive to the details of the image to be printed and to the printing speed. In particular, when airflows are set to prevent DD, the printing of images containing abrupt changes between regions of continuous white and black, as in a logo, exacerbates the PO defect under high speed printing conditions.

U.S. Pat. No. 7,766,471 B2 to Kato and Tonishi, and U.S. Patent Publication Nos. 2008/0207805 A1 to Blease et al. and 2009/0169761 A1 to Szajewski et al. are directed at drop-on-demand (DOD) thermal bubble or piezoelectric drop ejectors and disclose pigmented aqueous inkjet ink sets where the dynamic surface tension at low surface ages has been reduced by inclusion of surfactants or surface active, polar protic organic co-solvents to address ink-on-ink and other print image quality defects such as intercolor bleed, feathering, mottle and graininess, and coalescence. The DOD ink compositions are typically comprised of a minimum of about 10 wt % of humectant and organic co-solvent to maintain the ink pigment particles in a dispersed state and to prevent the drop ejector from drying out, which would result in crooked or blocked jets. In addition, the stability of the DOD ink compositions to fluidic forces associated with CIJ recirculating filtration is not assured, since the inks are delivered to the nozzles by passive fluidic forces and not active mechanical pumping, and since the fired ink that is ejected from the nozzles is never re-used.

SUMMARY OF THE INVENTION

An aqueous inkjet black ink composition for use in continuous ink jet printing is provided comprising black pigment particles dispersed with a polymeric dispersant or self dispersing pigment particles without the need for a dispersant; and at least one surfactant, wherein the at least one surfactant is selected to provide the ink composition with a 10-ms dynamic surface tension of less than 54 mN/m.

Also provided is an aqueous inkjet ink set for use in continuous inkjet printing comprising at least one cyan ink, at least one yellow ink, at least one magenta ink, and at least one black ink, wherein each ink of the ink set comprises dispersed pigment particles and at least one surfactant selected to provide a 10-ms dynamic surface tension of less than 54 mN/m for each ink.

In addition, a method of printing an image with a continuous inkjet printer system is provided comprising providing a jetting module including a nozzle in fluid communication with a liquid ink source; causing liquid ink to be jetted through the nozzle; causing liquid ink drops to be formed from the ink that is jetted through the nozzle; providing a catcher including a liquid drop contact face; using a deflection mechanism to deflect at least some of the liquid ink drops onto the liquid drop contact face of the catcher; and allowing other liquid ink drops to pass by the catcher and deposit onto a print media; and causing the liquid drops that contact the liquid drop contact face to flow along the contact face; wherein the liquid ink is an aqueous inkjet black ink comprising a black colorant and at least one surfactant selected to provide a 10-ms dynamic surface tension of less than 54 mN/m. The invention further provides a method wherein full color images may be printed by further similarly employing at least second, third and fourth jetting modules and yellow, magenta and cyan inks each also comprising a surfactant selected to provide a 10-ms dynamic surface tension of less than 54 mN/m for each ink.

Advantageous Effect of the Invention

The invention provides numerous advantages. It has been most surprisingly found that the fluid properties of an ink film formed on the catcher face can be improved under dynamic printing conditions at high transport speed and print drop firing frequency to restore operating print margin, and in particular engineering tolerance or latitude for air deflection settings, by reducing the ink 10-ms dynamic surface tension to less than 54 mN/m. Demanding print images can again be printed that simultaneously are substantially free of both DD and PO defects. By careful selection of surfactant combinations, dynamic surface tension can be lowered while ink-media print defects are avoided, such as ink droplet or rivulet coalescence on low absorption glossy coated substrates. Recycled ink foam dissipation rates can also be minimally affected, avoiding the formation of excessive ink tank foam heads that disrupt fluid system function.

BRIEF DESCRIPTION OF THE DRAWINGS

In the detailed description of the example embodiments of the invention presented below, reference is made to the accompanying drawings, in which.

DETAILED DESCRIPTION OF THE INVENTION

Figure 1:
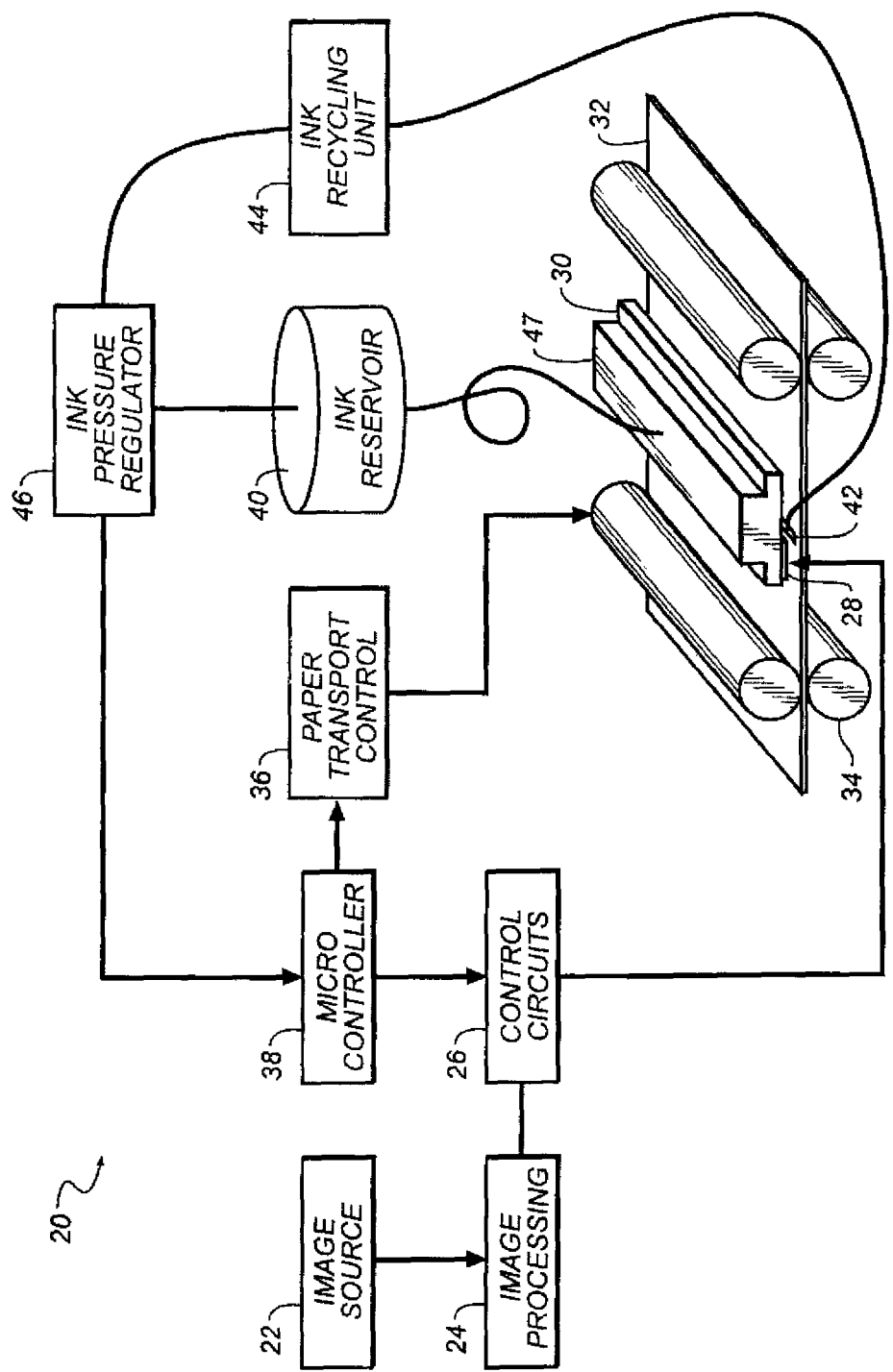
FIG. 1 shows a simplified schematic block diagram of an example embodiment of a printing system made in accordance with the present invention.

The present description will be directed in particular to elements forming part of, or cooperating more directly with, continuous inkjet printing (CIJ) system apparatus which may be employed in accordance with various embodiments of the present invention. It is to be understood that elements not specifically shown or described may take various forms well known to those skilled in the art. In the following description and drawings, identical reference numerals have been used, where possible, to designate identical elements.

The example embodiments of the CIJ printing system employed in present invention are illustrated schematically and not to scale for the sake of clarity. One of the ordinary skills in the art will be able to readily determine the specific size and interconnections of the elements of the example embodiments.

As described herein, the example embodiments provide a printhead or printhead components typically used in continuous inkjet printing systems. However, many other applications are emerging which use inkjet printheads to emit liquids (other than inks) that need to be finely metered and deposited with high spatial precision. As such, as described herein, the terms "liquid," "fluid" and "ink" refer to any material that can be ejected by the printhead or printhead components described below.

Referring to FIG. 1, a continuous printing system 20 includes an image source 22 such as a scanner or computer which provides raster image data, outline image data in the form of a page description language, or other forms of digital image data. This image data is converted to half-toned bitmap image data by an image processing unit 24 which also stores the image data in memory. A plurality of drop forming mechanism control circuits 26 read data from the image memory and apply time-varying electrical pulses to a drop forming mechanism(s) 28 that are associated with one or more nozzles of a printhead 30. These pulses are applied at an appropriate time, and to the appropriate nozzle, so that drops formed from a continuous ink jet stream will form spots on a recording medium 32 in the appropriate position designated by the data in the image memory.

Recording medium 32 is moved relative to printhead 30 by a recording medium transport system 34, which is electronically controlled by a recording medium transport control system 36, and which in turn is controlled by a micro-controller 38. The recording medium transport system shown in FIG. 1 is a schematic only, and many different mechanical configurations are possible. For example, a transfer roller could be used as recording medium transport system 34 to facilitate transfer of the ink drops to recording medium 32. Such transfer roller technology is well known in the art. In the case of page width printheads, it is most convenient to move recording medium 32 past a stationary printhead. However, in the case of scanning print systems, it is usually most convenient to move the printhead along one axis (the sub-scanning direction) and the recording medium along an orthogonal axis (the main scanning direction) in a relative raster motion.

Ink is contained in an ink reservoir 40 under pressure. In the non-printing state, continuous ink jet drop streams are unable to reach recording medium 32 due to an ink catcher 42 that blocks the stream and which may allow a portion of the ink to be recycled by an ink recycling unit 44. The ink recycling unit reconditions the ink and feeds it back to reservoir 40. Such ink recycling units are well known in the art. The ink pressure suitable for optimal operation will depend on a number of factors, including geometry and thermal properties of the nozzles and thermal properties of the ink. A constant ink pressure can be achieved by applying pressure to ink reservoir 40 under the control of ink pressure regulator 46. Alternatively, the ink reservoir can be left unpressurized, or even under a reduced pressure (vacuum), and a pump is employed to deliver ink from the ink reservoir under pressure to the printhead 30. In such an embodiment, the ink pressure regulator 46 can comprise an ink pump control system. As shown in FIG. 1, catcher 42 is a type of catcher commonly referred to as a "knife edge" catcher.

The ink is distributed to printhead 30 through an ink channel 47. The ink preferably flows through slots or holes etched through a silicon substrate of printhead 30 to its front surface, where a plurality of nozzles and drop forming mechanisms, for example, heaters, are situated. When printhead 30 is fabricated from silicon, drop forming mechanism control circuits 26 can be integrated with the printhead. Printhead 30 also includes a deflection mechanism (not shown in FIG. 1) which is described in more detail below with reference to FIGS. 2 and 3.

Figure 2:
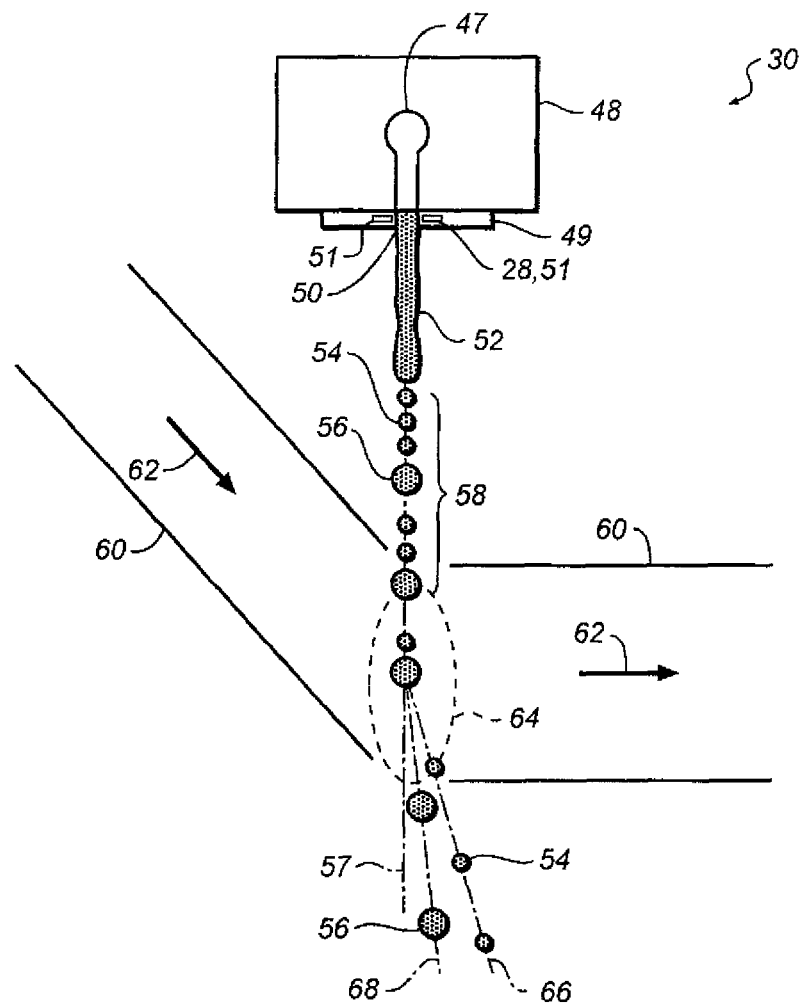
FIG. 2 is a schematic view of an example embodiment of a continuous printhead made in accordance with the present invention.

Referring to FIG. 2, a schematic view of continuous liquid printhead 30 is shown. A jetting module 48 of printhead 30 includes an array or a plurality of nozzles 50 formed in a nozzle plate 49. In FIG. 2, nozzle plate 49 is affixed to jetting module 48. However, nozzle plate 49 can be an integral portion of the jetting module 48.

Liquid, for example, ink, is emitted under pressure through each nozzle 50 of the array to form filaments of liquid 52. In FIG. 2, the array or plurality of nozzles extends into and out of the figure.

Jetting module 48 is operable to form liquid drops having a first size or volume and liquid drops having a second size or volume through each nozzle. To accomplish this, jetting module 48 includes a drop stimulation or drop forming device 28, for example, a heater or a piezoelectric actuator, that, when selectively activated, perturbs each filament of liquid 52, for example, ink, to induce portions of each filament to breakoff from the filament and coalesce to form small drops 54 and large drops 56.

In FIG. 2, drop forming device 28 is a heater 51, for example, an asymmetric heater or a ring heater (either segmented or not segmented), located in a nozzle plate 49 on one or both sides of nozzle 50. This type of drop formation is known and has been described in, for example, U.S. Pat. Nos. 6,457,807 B1, 6,491,362 B1, 6,505,921 B2, 6,554,410 B2, 6,575,566 B1, 6,588,888 B2, 6,793,328 B2, 6,827,429 B2, and 6,851,796 B2.

Typically, one drop forming device 28 is associated with each nozzle 50 of the nozzle array. However, a drop forming device 28 can be associated with groups of nozzles 50 or all of nozzles 50 of a nozzle array.

When printhead 30 is in operation, drops 54, 56 are typically created in a plurality of sizes or volumes, for example, in the form of large drops 56, a first size or volume, and small drops 54, a second size or volume. The ratio of the mass of the large drops 56 to the mass of the small drops 54 is typically approximately an integer between 2 and 10. A drop stream 58 including drops 54, 56 follows a drop path or trajectory 57.

Printhead 30 also includes a gas flow deflection mechanism 60 that directs a flow of gas 62, for example, air, past a portion of the drop trajectory 57. This portion of the drop trajectory is called the deflection zone 64. As the flow of gas 62 interacts with drops 54, 56 in deflection zone 64 it alters the drop trajectories. As the drop trajectories pass out of the deflection zone 64 they are traveling at an angle, called a deflection angle, relative to the undeflected drop trajectory 57.

Small drops 54 are more affected by the flow of gas than are large drops 56 so that the small drop trajectory 66 diverges from the large drop trajectory 68. That is, the deflection angle for small drops 54 is larger than for large drops 56. The flow of gas 62 provides sufficient drop deflection and therefore sufficient divergence of the small and large drop trajectories so that catcher 42 (shown in FIGS. 1 and 3) can be positioned to intercept one of the small drop trajectory 66 and the large drop trajectory 68 so that drops following the trajectory are collected by catcher 42 while drops following the other trajectory bypass the catcher and impinge a recording medium 32 (shown in FIGS. 1 and 3).

When catcher 42 is positioned to intercept large drop trajectory 68, small drops 54 are deflected sufficiently to avoid contact with catcher 42 and strike the print media. As the small drops are printed, this is called small drop print mode. When catcher 42 is positioned to intercept small drop trajectory 66, large drops 56 are the drops that print. This is referred to as large drop print mode.

Figure 3:
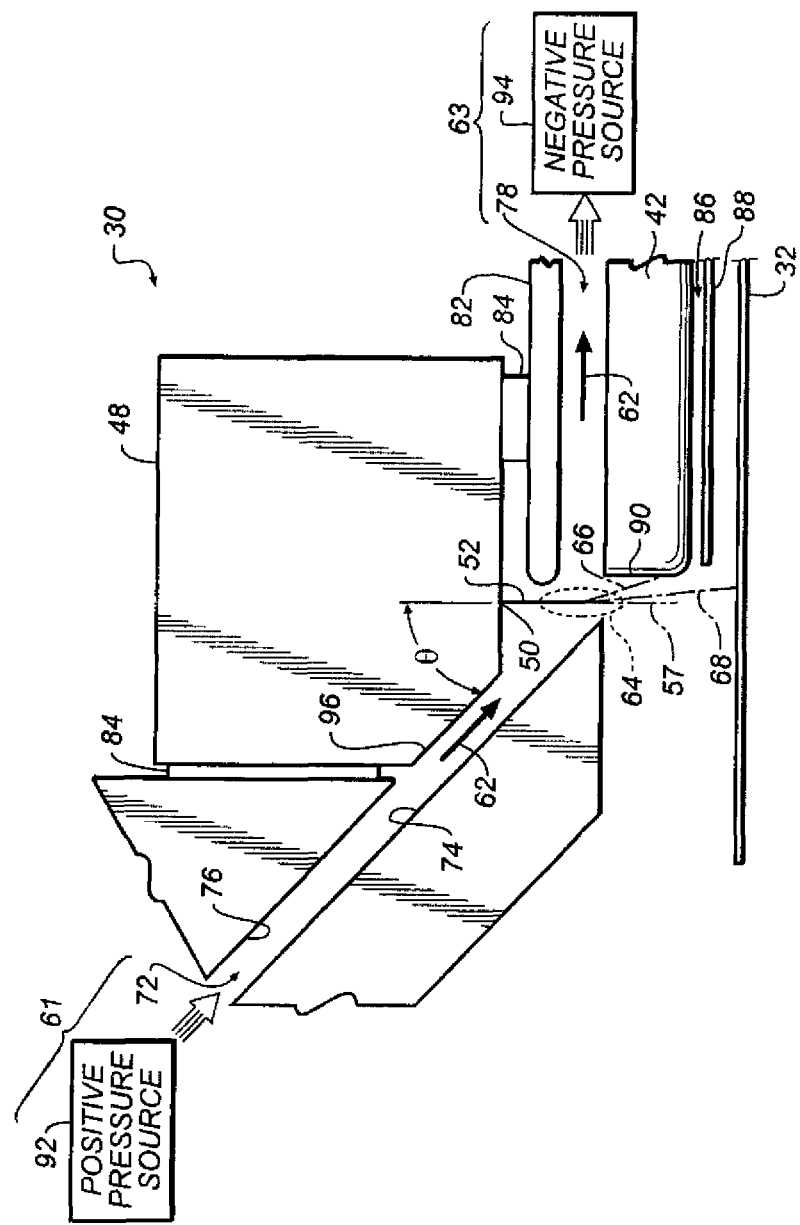
FIG. 3 is a schematic view of an example embodiment of a continuous printhead made in accordance with the present invention.

Referring to FIG. 3, jetting module 48 includes an array or a plurality of nozzles 50. Liquid, for example, ink, supplied through channel 47 (FIGS. 1 and 2), is emitted under pressure through each nozzle 50 of the array to form filaments of liquid 52. In FIG. 3, the array or plurality of nozzles 50 extends into and out of the figure.

Drop stimulation or drop forming device 28 (shown in FIGS. 1 and 2) associated with jetting module 48 is selectively actuated to perturb the filament of liquid 52 to induce portions of the filament to break off from the filament to form drops. In this way, drops are selectively created in the form of large drops and small drops that travel toward a recording medium 32.

Positive pressure gas flow structure 61 of gas flow deflection mechanism 60 (FIG. 2) is located on a first side of drop trajectory 57. Positive pressure gas flow structure 61 includes first gas flow duct 72 that includes a lower wall 74 and an upper wall 76. Gas flow duct 72 directs gas flow 62 supplied from a positive pressure source 92 at downward angle θ of approximately a 45° relative to liquid filament 52 toward drop deflection zone 64 (also shown in FIG. 2). An optional seal(s) 84 provides an air seal between jetting module 48 and upper wall 76 of gas flow duct 72. In FIG. 3, wall 96 of jetting module 48 serves as a portion of upper wall 76 ending at drop deflection zone 64.

Negative pressure gas flow structure 63 (FIG. 3) of gas flow deflection mechanism 60 (FIG. 2) is located on a second side of drop trajectory 57. Negative pressure gas flow structure includes a second gas flow duct 78 located between catcher 42 and an upper wall 82 that exhausts gas flow from deflection zone 64. Second duct 78 is connected to a negative pressure source 94 that is used to help remove gas flowing through second duct 78. An optional seal(s) 84 provides an air seal between jetting module 48 and upper wall 82.

As shown in FIG. 3, the gas flow deflection mechanism includes positive pressure source 92 and negative pressure source 94. However, depending on the specific application contemplated, the gas flow deflection mechanism can include only one of positive pressure source 92 and negative pressure source 94.

Gas supplied by first gas flow duct 72 is directed into the drop deflection zone 64, where it causes large drops 56 to follow large drop trajectory 68 and small drops 54 to follow small drop trajectory 66. As shown in FIG. 3, small drop trajectory 66 is intercepted by a front face 90 of catcher 42. Small drops 54 contact face 90 and flow down face 90 and into a liquid return duct 86 located or formed between catcher 42 and a plate 88. Collected liquid is either recycled and returned to ink reservoir 40 (shown in FIG. 1) for reuse or discarded. Large drops 56 bypass catcher 42 and travel on to recording medium 32. Thus, FIG. 3 depicts operation in a large drop print mode. Alternatively, catcher 42 can be positioned to intercept large drop trajectory 68. Large drops 56 contact catcher 42 and flow into a liquid return duct located or formed in catcher 42. Collected liquid is either recycled for reuse or discarded. Small drops 54 bypass catcher 42 and travel on to recording medium 32.

Alternatively, deflection can be accomplished by applying heat asymmetrically to filament of liquid 52 using an asymmetric heater 51. When used in this capacity, asymmetric heater 51 typically operates as the drop forming mechanism in addition to the deflection mechanism. This type of drop formation and deflection is known having been described in, for example, U.S. Pat. No. 6,079,821, issued to Chwalek et al., on Jun. 27, 2000. Deflection can also be accomplished using an electrostatic deflection mechanism. Typically, the electrostatic deflection mechanism either incorporates drop charging and drop deflection in a single electrode, like the one described in U.S. Pat. No. 4,636,808, or includes separate drop charging and drop deflection electrodes.

As shown in FIG. 3, catcher 42 is a type of catcher commonly referred to as a "Coanda" catcher. However, the "knife edge" catcher shown in FIG. 1 and the "Coanda" catcher shown in FIG. 3 are interchangeable and either can be used usually the selection depending on the application contemplated. Alternatively, catcher 42 can be of any suitable design including, but not limited to, a porous face catcher, a delimited edge catcher, or combinations of any of those described above.

Useful ink agitation, heated ink supply and printhead and fluid filtration means for CIJ pigmented inkjet ink compositions are described in U.S. Pat. No. 6,817,705 to Crockett et al. Additional printer replenishing system approaches for maintaining ink quality and countering the effects of volatile ink component evaporation are described in U.S. Pat. No. 5,473,350 to Mader et al. Further useful continuous inkjet fluid systems based on replenishment schemes that measure fluid electrical resistivity are described in U.S. Pat. No. 5,526,026, and in EP 0 597 628 B1, the disclosures of which are herein incorporated by reference in their entirety. Useful supporting concepts for continuous inkjet fluid systems that employ other means ink concentration sensing are disclosed in EP 0 571 784 B1 and EP 1 013 450 B1 and in U.S. Pat. No. 7,221,440, the disclosures of which are also incorporated by reference.

The inkjet printing fluids of the present invention are aqueous-based printing fluids designed for use in relatively high-speed continuous inkjet (CIJ) printing systems as described above. By aqueous-based it is meant that the printing fluid comprises mainly water as the carrier medium for the remaining printing fluid components. In a preferred embodiment, the printing fluids of the present invention comprise at least about 50-weight percent water. Pigment-based inks are defined as inks containing at least a dispersion of water-insoluble pigment particles. Dye-based inks are defined as inks containing at least a colored molecular dye, which is soluble in the aqueous carrier. Colorless inks are defined as inks, which are substantially free of colorants such as dyes or pigments and as such, are not intended to contribute to color formation in the image forming process.

In contrast to sheet-fed drop-on-demand printing, CIJ is a very high speed printing process, and it is desired to operate at substrate transport speeds in excess of 100 feet/minute (FPM) and at addressabilities higher than 300×300 dpi. Printing speed alone imposes some limitations on ink formulation relative to slower drop-on-demand printing techniques, simply on the basis of the short time requirements for adequately drying the printed substrate moving at full speed in the press before roll wind-up. Surprisingly, however, features of CIJ printhead operation can allow wider ink formulation latitude than is possible in DOD printing in other respects. Ink formulation considerations specific to traditional CIJ printing are described in W. Wnek, *IEEE Trans*. 1986, 1475-81, which elucidates the ink performance requirements for drop formation, deflection and catching of non-printing drops, recirculation of the ink to the printhead from the storage reservoir for future printing, and also for commercial ink-media image quality and durability.

An inkjet ink composition for use in a continuous inkjet printer desirably contains water as the principal vehicle or carrier medium, colorant, humectant, biocide, and surfactant; it can desirably further contain one or more types of other components, including and not limited to a film-forming binder or mordant, a solubilizing agent, a co-solvent, a base, an acid, a pH buffer, a wetting agent, a chelating agent, a corrosion inhibitor, a viscosity modifier, a penetrant, a wetting agent, an antifoamant, a defoamer, an antifungal or antibacterial agent, a jetting aid, a filament length modifier, a trace of multivalent cationic flocculating salt, a solution conductivity control agent, or a compound for suppressing electrostatic deflection charge shorts when ink dries on the charge ribbon electrodes, if that mode of drop deflection is to be employed.

Polymers are desirably present in the continuous inkjet inks of the invention. The polymers can act as pigment dispersants, as ingredient binders which may form films and increase printed image dry physical or wet durability, as fluid system recirculation stabilizers, as jetting-aids, as surface active and surface modifying agents, or they can fulfill other useful functions. These polymers can be classified as water-soluble polymers, water-reducible polymers or water-dispersible polymeric particles.

By the term "water-soluble" is meant that the polymer is dissolved in water such that scattering is not observed when a dilute solution of the polymer is analyzed using dynamic light scattering or any other technique well known in the art of particle analysis.

By the term "water-reducible" is meant that the polymer can be diluted with water to form reasonably stable dispersions of polymer aggregates swollen by solvent and water, as described in "Organic Coatings: Science and Technology" (2nd Edition by Wicks, Jones and Papas, published by Wiley-Interscience, 1999). Such polymers can have hydrophilic acid groups in some monomers, but are not water soluble until partially or fully neutralized by base.

By the term "water-dispersible" is meant that the polymer exists in the form of discrete particles in water, the particles being dispersed or suspended and often stabilized against flocculation and settling by the use of dispersing agents. In contrast to a water-soluble polymer, a dilute solution of a water-dispersible polymer exhibits scattering when analyzed using dynamic light scattering or any other technique well known in the art of particle analysis.

In various embodiments, the invention employs dispersed pigment particles as colorants, and in particular dispersed black pigment particles in a black ink formulated for continuous inkjet printing, and dispersed black, cyan, magenta, and yellow pigment particles in black, cyan, magenta, and yellow inks of an ink set formulated for inkjet printing.

Pigment-based ink compositions useful in the invention may be prepared by any method known in the art of ink jet printing. Useful methods commonly involve two steps: (a) a dispersing or milling step to break up the pigment aggregate into primary particles, where primary particle is defined as the smallest identifiable subdivision in a particulate system, and (b) a dilution step in which the pigment dispersion from step (a) is diluted with the remaining ink components to give a working strength ink. The pigment milling step (a) may be carried out using any type of grinding mill such as a stirred media mill, a ball mill, a two-roll mill, a three-roll mill, a bead mill, and air-jet mill, an attritor, a high speed disperser, a horizontal mill, or a liquid interaction chamber. In the milling step (a), pigments are optionally suspended in a medium, which is typically the same as, or similar to, the medium used to dilute the pigment dispersion in step (b). Inert milling media are optionally present in the milling step (a) in order to facilitate breakup of the pigments to primary particles. Inert milling media include such materials as polymeric beads, glasses, ceramics, metals and plastics as described, for example, in U.S. Pat. No. 5,891,231. Milling media are removed from either the pigment dispersion obtained in step (a) or from the ink composition obtained in step (b). Related milling, dispersing, grinding or comminution processes that are highly suitable to the practice of the invention are described in U.S. Pat. Nos. 5,478,705 A, 5,513,805 A, 5,662,279 A, 5,679,138 A, 5,862,999 A, 5,985,071 A, and 6,600,559 B2. A particularly preferred milling process is disclosed in U.S. Pat. No. 7,441,717 B1 issued to Majka et al., and its disclosure is herein incorporated by reference.

A dispersant is preferably present in the milling step (a) in order to facilitate breakup of the pigment agglomerate into primary particles. For the pigment dispersion obtained in step (a) or the ink composition obtained in step (b), the dispersant is present in order to maintain particle stability and to prevent particle aggregation followed by settling; the dispersant may either be an amphiphilic molecular surfactant or a polymer. In addition to the dispersant, there may be, optionally, additional dispersants or polymers present for use in the invention such as those commonly used in the art of ink jet printing. For aqueous pigment-based ink compositions, useful dispersants include anionic, or nonionic surfactants such as sodium dodecyl sulfate, or potassium or sodium oleylmethyltaurate as described in, for example, U.S. Pat. Nos. 5,679,138, 5,651,813, and 5,985,017.

Pigment colorants employed in inks of the invention are desirably dispersed using an amphiphilic polymeric dispersant. While a polymeric dispersant or binder is desirable, there is no requirement that the pigmented ink jet ink composition of the invention contain a polymeric material, as long as a stable dispersion of the pigment is provided such that the ink is stable to recirculation in a continuous inkjet printing system. The polymeric dispersant or binder desirably comprises at least one hydrophobic monomer. The hydrophobic monomer used to prepare the polymeric dispersant or binder is comprised of a carboxylic acid ester-containing functional group. The hydrophobic monomers may be selected from any aliphatic acrylate or methacrylate monomer provided it contains an aliphatic chain comprising greater than or equal to as few as 12 carbon atoms, which may be linear or branched. Specific examples of useful hydrophobic monomers include the following: lauryl acrylate, lauryl methacrylate, tridecyl acrylate, tridecyl methacrylate, tetradecyl acrylate, tetradecyl methacrylate, cetyl acrylate, iso-cetyl acrylate, stearyl methacrylate, iso-stearyl methacrylate, stearyl acrylate, stearyl methacrylate, decyltetradecyl acrylate, decyltetradecyl methacrylate, and the like. Preferably the methacrylate or acrylate monomer is stearyl or lauryl methacrylate or acrylate. The hydrophobic portion of the polymer may be prepared from one or more of the hydrophobic monomers.

Desirably, the hydrophobic monomer having a carbon chain length of greater than or equal to 12 carbons is present in an amount of at least 10% by weight of the total copolymer, and more preferably greater than 20% by weight. The copolymer may also comprise a hydrophobic monomer comprising an aromatic group. For example, the additional aromatic group containing monomer may be benzyl acrylate or benzyl methacrylate.

The total amount of hydrophobic monomers, comprising the monomer having a chain with greater than or equal to 12 carbons and optionally, monomer containing an aromatic group, are preferably present in the polymer in an amount of 20 to 95% by weight of the total polymer. The hydrophobic aromatic-group containing monomer may be present in an amount from about 0 to 85% by weight of the total polymer, more preferably from about 0 to 60%, and most preferably from about 0 to 50%. Preferred copolymer dispersants are those where the hydrophilic monomer is selected from carboxylated monomers. Preferred polymeric dispersants are copolymers prepared from at least one hydrophilic monomer that is an acrylic acid or methacrylic acid monomer, or combinations thereof. Preferably, the hydrophilic monomer is methacrylic acid. Particularly useful polymeric pigment dispersants are further described in US 2006/0012654 A1, US 2007/0043144 A1, and US 2007/0043146 A1, the disclosures of which are incorporated herein by reference.

The monomers comprising the polymeric dispersant or binder may be totally random, or they may be arranged in blocks such as AB or ABA wherein, A is the hydrophobic monomer and B is the hydrophilic monomer. In addition, the polymer make take the form of a random terpolymer or an ABC triblock wherein, at least one of the A, B and C blocks is chosen to be the hydrophilic monomer and the remaining blocks are hydrophobic blocks dissimilar from one another. Preferably the copolymer is a random copolymer or terpolymer.

In a preferred embodiment of the invention, the ink jet ink composition is comprised of a pigment dispersion consisting of pigment colorant particles in association with a polymeric dispersant or a polymeric binder prepared from at least one hydrophilic monomer that is an acrylic acid or methacrylic acid monomer, or combinations thereof, and at least one monomer comprised of a hydrophobic methacrylate or acrylate monomer containing an aliphatic chain having greater than or equal to 12 carbons, as disclosed in U.S. Patent Publication Nos. 2007/0043144 and 2007/0043146. Other polymeric dispersants and binders useful in the practice of the invention are described in U.S. Patent Publication No. 2006/0014855 A1 to House et al., the disclosure of which is herein incorporated by reference.

Typically, the weight average molecular weight of the copolymer dispersant or binder has an upper limit such that it is less than about 50,000 daltons. Desirably the weight average molecular weight of the copolymer is less than about 25,000 daltons; more preferably it is less than 15,000 and most preferably less than 10,000 daltons. The molecular weight of the binder or dispersant has a weight average molecular weight lower limit such that it is greater than about 500 daltons.

A wide variety of organic and inorganic pigments, alone or in combination with each other, may be used in the ink composition of the present invention. For example, a carbon black pigment may be combined with a colored pigment such as a cyan copper phthalocyanine or a magenta quinacridone pigment in the same ink composition. Pigments that may be used in the invention include those disclosed in, for example, U.S. Pat. Nos. 5,026,427, 5,086,698, 5,141,556, 5,160,370, and 5,169,436. The exact choice of pigments will depend upon the specific application and performance requirements such as color reproduction and image stability.

Pigment colorants suitable for use in the invention include, but are not limited to, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. Carbon black is preferable as a pigment for black ink. Carbon black pigment may be produced by any available process and useful pigments include furnace blacks, lamp blacks, acetylene blacks, channel blacks and gas blacks. Especially suitable carbon black pigments include NIPex® 160 IQ, NIPex 170 IQ, NIPex 180

IQ and Colour Black FW 2, Colour Black FW 200, Colour Black FW 285, Colour Black FW 1, Colour Black FW 18, Colour Black FW, Colour Black FW 18, Printex® 95 pigments produced by Orion Engineered Carbons, and Black Pearls® 1100, Black Pearls 900, Black Pearls 880, Black Pearls 600, Monarch® 1100, and Monarch 900 pigments by Cabot Corp. Other black pigments are also acceptable and may be comprised of magnetic particles such as magnetite or ferrite, or titanium black may also be used.

Typical examples of pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; or C.I. Pigment Brown 1, 5, 22, 23, 25, 38, 41, 42. The pigmented ink jet ink composition of the invention for use in a continuous ink jet printer in a particular embodiment can be comprised of an additional water soluble dye colorant, as disclosed in EP 1 132 440 A2 to Botros et al., and EP 0 859 036 A1 to J-D. Chen.

The inks of the invention could also optionally comprise self-dispersing pigments that are dispersible and stable without the use of a polymeric or molecular dispersant or surfactant. Pigments of this type are generally those that have been subjected to a surface treatment such as oxidation/reduction, acid/base treatment, or functionalization through coupling chemistry. The surface treatment can functionalize the surface of the pigment with anionic, cationic or non-ionic groups. Examples of suitable self-dispersing type black pigments include, but are not limited to, Cab-O-Jet® 200, Cab-O-Jet® 300, Cab-O-Jet® 352K, Cab-O-Jet® 400 (Cabot Corp.) and Bonjet® Black CW-1, CW-1S, CW-2, and CW-3 (Orient Chemical Industries, Ltd.).

The pigment particles of the pigment-based continuous ink jet ink composition of the present invention preferably have a median particle diameter of less than about 150 nm and more preferably less than 100 nm, and most preferably less than about 50 nm. As used herein, median particle diameter refers to the 50th percentile of the classified particle size distribution such that 50% of the volume of the particles is provided by particles having diameters smaller than the indicated diameter. Particularly desirable pigment particle sizes are those that satisfy the particle Peclet number requirements for stable continuous ink jet fluid drop formation properties, as taught in WO 2009/044096 by Clarke et al.

The pigments used in the ink composition of the invention may be present in any effective amount, generally from 0.1 to 10% by weight, and preferably from 0.5 to 6% by weight. In one embodiment the weight ratio of the polymeric dispersant to the pigment is 0.15 to 0.9.

The inks of the invention could also optionally comprise, in addition to the pigment dispersion, dyes known in the art of ink jet printing. For aqueous-based ink compositions dyes suitable for use in the invention include, but are not limited to, water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes and the like. Specific examples of dyes usable in the present invention are as follows: yellow dyes including: C.I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165; C.I. Direct Yellow 1, 8, 11, 12, 24, 26, 27, 33, 39, 44, 50, 58, 85, 86, 87, 88, 89, 98, 110, 132, 142, and 144; C.I. Reactive Yellow 1, 2, 3, 4, 6, 7, 11, 12, 13, 14, 15, 16, 17, 18, 22, 23, 24, 25, 26, 27, 37, and 42; and C.I. Food Yellow 3 and 4; magenta dyes including: C.I. Acid Red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, and 322; C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231; C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, and 64; and C.I. Food Red 7, 9, and 14; cyan dyes including: C.I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236, and 249; C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, and 249; C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, and 46; and C. I. Food Blue 1 and 2; black dyes including: C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, and 191; C.I. Direct Black 17, 19, 22, 32, 39, 51, 56, 62, 71, 74, 75, 77, 94, 105, 106, 107, 108, 112, 113, 117, 118, 132, 133, 146, 154, and 168; C.I. Reactive Black 1, 3, 4, 5, 6, 8, 9, 10, 12, 13, 14, 31, and 18; and C.I. Food Black 2, CAS No. 224628-70-0 sold as JPD Magenta EK-1 Liquid from Nippon Kayaku Kabushiki Kaisha; CAS No. 153204-88-7 sold as Intrajet® Magenta KRP from Crompton and Knowles Colors; the metal azo dyes disclosed in U.S. Pat. Nos. 5,997,622 and 6,001,161.

Polymers useful in the ink compositions of the invention, in addition to the polymeric dispersants described above, include nonionic, anionic, and amphoteric polymers. Representative examples of water soluble polymers include, polyvinyl alcohols, polyvinyl acetates, polyvinyl pyrrolidones, carboxymethyl cellulose, polyethyloxazolines, and polyamides. Representative examples of water-reducible polymers include alkali soluble resins, polyurethanes (such as those found in U.S. Pat. No. 6,268,101), polyacrylic acids, styrene-acrylic methacrylic acid copolymers (such as Joncryl® 70 from BASF Corp., TruDot® IJ-4655 from MeadWestvaco Corp., and Vancryl® 68S from Air Products and Chemicals, Inc) and polymers exemplified in U.S. Pat. No. 6,866,379 and U.S. Patent Application No 2005/0134665 A1.

The water-dispersible polymer particles are generally classified as either addition polymers or condensation polymers, both of which are well known to those skilled in the art of polymer chemistry. Examples of water-dispersible polymer particle classes include acrylics, styrenics, polyethylenes, polypropylenes, polyesters, polyamides, polyurethanes, polyureas, polyethers, polycarbonates, polyacid anhydrides, and copolymers consisting of combinations thereof. Such polymer particles can be ionomeric; film-forming, non-film-forming, fusible, or heavily cross-linked and can have a wide range of molecular weights and glass transition temperatures. Examples of water dispersible polymeric particles used in inkjet inks are styrene-acrylic copolymers sold under the trade names Joncryl® (BASF Corp.), Ucar™ (Dow Chemical Co.), Jonrez® (MeadWestvaco Corp.), and Vancryl® (Air Products and Chemicals, Inc.); sulfonated polyesters sold under the trade name Eastman AQ® (Eastman Chemical Co.); polyethylene or polypropylene resin emulsions and polyurethanes (such as the Witcobonds® from Witco Corp.). These polymeric particles are preferred because they are compatible in typical aqueous-based ink compositions, and because they render printed images that are highly durable towards physical abrasion, light and ozone.

Core-shell polymer particles have also been employed in inkjet inks for water-fastness and rub-resistance improvements (U.S. Pat. Nos. 5,814,685, 5,912,280, 6,057,384, 6,271,285, 6,858,301). Additional examples of water dispersible polymer particles include the thermoplastic resin particles as disclosed in U.S. Pat. Nos. 6,147,139 and 6,508,548. The polymer particles may be a mixture of high and low glass transition temperature polymers such as those disclosed in U.S. Pat. No. 6,498,202. Additionally, core-shell polymer particles as described in U.S. Pat. Nos. 5,814,685, 5,912,280, 6,057,384, 6,271,285, and 6,858,301 can be employed. It is also possible to include in the ink, in addition to the durability enhancing polymer particles, heavily cross-linked polymer particles.

Particularly preferred polymers for use in the black, cyan, magenta and yellow inks of the ink sets of the invention are water soluble polyacrylate co-polymers and polyurethane latex binder co-polymers, which may be used alone or in mixtures. The polyacrylate co-polymers may be amphiphilic pigment dispersants, or they may not adsorb at all to the pigment colorant and may serve to provide other advantages. Polyester polymers, i.e., polymers having ester backbone linkages, are not preferred since the hydrolysis of the ester function in the aqueous ink on storage can lead to polymer backbone fragmentation and loss of functionality. For similar reasons polymers having side-chain ester functions are less favored.

While any useful quantity of a water soluble co-polyacrylate co-polymer can be employed, the inks of the invention can preferably comprise between 0.1% and 6.0% by weight of a water soluble polyacrylate polymer. The water soluble polyacrylate polymers can be either addition polymers or condensation polymers, both of which are well known to those skilled in the art of polymer chemistry. Specific examples include, but are not limited to: acrylic acid polymer; methacrylic acid polymer; styrene-acrylic acid copolymer, styrene-acrylic acid-acrylic acid alkyl ester copolymer, styrene-maleic acid co-polymer, styrene-maleic acid-acrylic acid alkyl ester copolymer, styrene-methacrylic acid copolymer, styrene-methacrylic acid-acrylic acid alkyl ester copolymer, styrene-maleic acid hemi ester copolymer, vinyl naphthalene-acrylic acid co-polymer, vinyl naphthalene-maleic acid co-polymer and so forth. Especially preferred water soluble polyacrylate polymers include benzylmethacrylate-acrylic acid co-polymers and styrene-maleic acid hemi ester co-polymers. These polymers are rendered water soluble by the presence of the acid group originating in the acrylic acid, maleic acid or methacrylic acid moiety of the polymer. For polymers including acid groups, the extent of polymer charge stabilization is quantified as the polymer acid number (AN). A calculated polymer acid number is defined as the number of moles of acid monomer per gram of monomer in the polymer forming feedstock times 56 (which is the molecular weight of potassium hydroxide). A measured acid number is the number of moles of acid found per gram of polymer times 56, when titrating with potassium hydroxide in water. The water soluble polyacrylate polymer preferably exhibits an acid number between 100 and 400 and more preferably between 140 and 300 and a weight average molecular weight Mw between 5000 and 30,000 and more preferably between 6,000 and 16,000. Preferred polymeric binders include Joncryl 586, Joncryl 683, and Joncryl HPD 696 from BASF Corp.

Polyurethane latex binders may be formed from at least one monomer comprising at least two hydroxyl groups and at least one carboxyl group and another monomer comprising at least two isocyanate groups. While diisocyanates are typically used in the art of polyurethane chemistry, triisocyanates can also be used. Examples of diisocyanates include isophorone diisocyanate and others described in the above references. The polyurethanes which may be used in the inks of the invention are optionally derived from an additional monomer comprising at least two hydroxyl groups and which is different from the monomer having at least two hydroxyl groups and at least one carboxyl group. These optional monomers are typically higher molecular weight monomers having a molecular weight of less than 3000 daltons. They are often referred to in the art as polyols. Examples include polyols and polyhydroxy derivatives of polycarbonates, polyethers, polyesters, polyacetals, polyacrylates, polyester amides and polythioethers. Preferably the optional monomer is a polycarbonate or a polyether. More preferably, the optional monomer comprising at least two hydroxyl groups is a poly (hexamethylene carbonate) diol. Examples of monomers comprising at least two hydroxyl groups and at least one carboxylic acid group are 2,2-bis(hydroxymethyl) propionic acid and the hydroxyethylether of 4,4-bis(4-hydroxyphenyl)-valeric acid. Other examples are described in U.S. Pat. No. 6,268,101B2 and U.S. Patent Application No. 2003/0184629A1 and references cited therein. Water-dispersible polyurethanes are disclosed as binders in pigmented inks in U.S. Pat. No. 6,533,408, and particularly useful polyurethanes for pigmented inkjet inks which exhibit good jetting performance and good resulting image durability are described in U.S. Patent Application No. 2004/0085419A1, the disclosures of both are incorporated herein by reference. The polyurethane which may be used in the invention preferably has a weight average molecular weight, Mw, of greater than 7,500 daltons. If Mw is less than 7,500 daltons, then the inkjet ink composition may not provide adequate stain, smear and scratch resistance. An Mw of greater than 10,000 daltons is preferred. The maximum Mw of the polyurethane is not particularly limited, but is generally dictated by the physical property requirements of the composition and the method by which it will be applied, as discussed below. If the ink composition is used as an inkjet ink for a thermal printhead, then the maximum Mw of the polyurethane is preferably 50,000 daltons. The acid number of the polyurethane is provided by acid groups that are, in turn, provided by the at least one monomer comprising at least two hydroxyl groups. The acid groups are preferably carboxylic acid groups, but any type of acid groups may be used. The polyurethane latex binder can have an acid number between 50 and 200 and preferably has an acid number between 60 and 150 and most preferably between 70 and 110. The polyurethane which may be used in the invention can exhibit a glass transition temperature Tg of between 20 and 180° C., preferably a Tg of between 40 and 120° C., and more preferably a Tg of between 60 and 100° C.

While any useful quantity of a polyurethane latex binder can be employed, the cyan, magenta yellow, and black inks of the ink set of the invention in a preferred embodiment each preferably comprise between 0.1 and 5% by weight, and more preferably present at between 0.5 and 3% by weight of a polyurethane latex binder.

When these kinds of polymers are employed, best results are obtained when the weight ratio of dispersed pigment to the sum of water soluble polyacrylate polymer and polyurethane latex binder is between 3:1 and 1:2. More preferably, the weight ratio of dispersed pigment to the sum of water soluble polyacrylate polymer and polyurethane latex binder is between 2:1 and 1:1. Lower quantities of polymer can cause poor film formation while higher quantities of polymer can cause poor jetting, clogging of nozzles and ink coalescence on many printing media.

If present, non-colored particles used in the ink composition of the invention may be present in any effective amount, generally from 0.01 to 20% by weight, and preferably from 0.01 to 6% by weight. The exact choice of non-colored particles will depend upon the specific application and performance requirements of the printed image.

Water soluble or dispersible anionically charged polymers of the type described for use as pigment dispersants may alternatively or additionally be used in printing fluid compositions of the invention to provide improved jetting performance or improved fluid stability, and improved print durability. Acrylic polymers which may be employed in the present invention are exemplified by those disclosed in U.S. Pat. No. 6,866,379, which is incorporated herein in its entirety by reference. Specific examples of preferred water-soluble polymers useful in the present invention are copolymers prepared from at least one hydrophilic monomer that is an acrylic acid or methacrylic acid monomer, or combinations thereof. The water-soluble polymer may also be a styrene-acrylic copolymer comprising a mixture of vinyl or unsaturated monomers, including at least one styrenic monomer and at least one acrylic monomer, at least one of which monomers has an acid or acid-providing group. Such polymers are disclosed in, for example, U.S. Pat. Nos. 4,529,787; 4,358,573; 4,522,992; and 4,546,160; the disclosures of which are incorporated herein by reference. Additional useful anionic charged polymers that may be used in embodiments of the invention include water dispersible polyurethanes, such as those disclosed as binders in pigmented inks in U.S. Pat. No. 6,533,408, and particularly useful polyurethanes for pigmented inkjet inks which exhibit good jetting performance and good resulting image durability are described in U.S. Patent Publication No. 2004/0085419A1, the disclosures of both are incorporated herein by reference. U.S. Patent Publication Numbers 2006/0100306 and 2006/0100308 disclose the use of polyurethanes and mixtures of polyurethanes and acrylic polymers having specified acid numbers for use in clear ink compositions, which also may be used in embodiments of the present invention.

Additional water-soluble polymer additive(s) distinct from any dispersant used to disperse the pigment can further be employed to increase the stability of the pigment dispersion particles to ink fluid recirculation by a mechanical pump through a filter (i.e., recirculating filtration) in a CIJ fluid system, as disclosed in U.S. Patent Application No. 2011/0123714 A1 to Yau et al., and in U.S. Patent Application No. 2011/0122180 A1 to Cook et al., the disclosures of both are incorporated herein by reference in their entirety. The polymer additive may comprise, e.g., a water soluble copolymer, having block or random segments comprised of styrene and acrylic monomers, where the molecular weight of the additive is greater than 1000 as described in US 2011/0122180. The polymer additive preferably has a weight average molecular weight, Mw, of from about 1,000 to 100,000 daltons, more preferably from about 1,000 to about 50,000 daltons, and typically from about 1,000 to about 23,000 daltons. Such polymer additives may comprise, e.g., one or more polystyrene or substituted polystyrene chains copolymerized with other acrylate or substituted acrylate monomers or attached to another species. In one preferred embodiment, the polymer additive may comprise a copolymer of styrene, alpha-methylstyrene, acrylic acid and trisethylenoxyacrylate. The polymer additive may alternatively comprise a water soluble block copolymer having one or more poly(ethylene oxide) block segments which in total comprise from 50 to 99 wt % of the polymer additive, and from 1 to 50 wt % of segments relatively more hydrophobic than the poly(ethylene oxide) block segments, where the molecular weight of the at least one poly(ethylene oxide) segment of the additive is greater than 500, as described in US 2011/0123714.

A polymer additive is preferably present in the ink jet ink compositions of the invention in an amount effective to stabilize the ink composition against shear induced agglomeration, or other fluidic particle aggregation processes (e.g., compression, extension, cavitation, etc.), caused by pumping the ink composition through a continuous ink jet printing fluid system, but desirably not to substantially displace dispersant used to disperse the pigment in the ink composition. The concentration of the polymer additive material in the ink is typically from 0.05% to 5% by weight, preferably from 0.1% to 3% by weight, more preferably from 0.3% to 2% by weight, and most preferably from 0.5% to 1% by weight. The styrene-acrylic copolymer additive, e.g., when employed is preferably present at a weight ratio of from 1:10 to 1:2 relative to the dispersed pigment, more preferably from 1:6 to 1:3, and most preferably from 1:5 to 1:4.

It is also contemplated that the ink compositions of the present invention may also contain non-colored particles such as inorganic particles or polymeric particles. The use of such particulate addenda has increased over the past several years, especially in ink jet ink compositions intended for photographic-quality imaging. Examples of inorganic particles useful in the invention include, but are not limited to, alumina, boehmite, clay, calcium carbonate, titanium dioxide, calcined clay, aluminosilicates, silica, or barium sulfate. In a representative example, U.S. Pat. No. 5,925,178 describes the use of inorganic particles in pigment-based inks in order to improve optical density and rub resistance of the pigment particles on the image-recording element. Examples of organic polymeric particles useful in the invention include; water-dispersible polymers generally classified as either addition polymers or condensation polymers, both of which are well-known to those skilled in the art of polymer chemistry. Examples of polymer classes include acrylics, styrenics, polyethylenes, polypropylenes, polyesters, polyamides, polyurethanes, polyureas, polyethers, polycarbonates, polyacid anhydrides, and copolymers consisting of combinations thereof. Such polymer particles can be ionomeric, film-forming, non-film-forming, fusible, or heavily cross-linked and can have a wide range of molecular weights and glass transition temperatures.

U.S. Pat. No. 6,508,548 describes the use of a water-dispersible polymeric latex in dye-based inks in order to improve light and ozone resistance of the printed images. The ink composition may contain non-colored particles such as inorganic or polymeric particles in order to improve gloss differential, light and/or ozone resistance, waterfastness, rub resistance and various other properties of a printed image; see for example, U.S. Pat. Nos. 5,889,083 A, 6,598,967 A, and 6,508,548 A, and U.S. Patent Application No. 2009/0239004 A1.

Additional additives which may optionally be present in an ink jet ink composition suitable for CIJ printing include thickeners, conductivity enhancing agents, anti-kogation agents, drying agents, waterfastness agents, dye solubilizers, chelating agents, binders, light stabilizers, viscosifiers or thickeners, buffering agents, anti-mold agents, anti-cockle agents, anti-curl agents, stabilizers, antifoamants and defoamers. An aqueous ink jet ink composition for use in a continuous ink jet printer desirably contains water as the principal vehicle or carrier medium, colorant, humectant, biocide, and surfactant; it can desirably further contain one or more types of other components, including and not limited to a film-forming binder or mordant, a secondary colorant, a solubilizing agent, a co-solvent, a base, an acid, a pH buffer, a wetting agent, a chelating agent, a corrosion inhibitor, a viscosity modifier, a penetrant, a wetting agent, an antifoamant, a defoamer, an antifungal or antibacterial agent, a jetting aid, a filament length modifier, a trace of multivalent cationic flocculating salt, a solution conductivity control agent, or a compound for suppressing electrostatic deflection charge shorts when ink dries on the charge ribbon electrodes. Compounds useful for increasing pigment ink dried film resistivity for suppressing charge lead shorts are described in U.S. Pat. No. 5,676,744 to Thakkar et al. Inorganic and organic ink additives useful for controlled flocculation of pigmented ink jet compositions are described in U.S. 2004/0266908.

The pH of the inkjet ink composition directed at CIJ printing is desirably adjusted from about 8 to about 12; more desirably, the pH is about 8 to 10. In order to minimize the risk of excessively protonating carboxylate anions associated with any polymeric dispersant or binder that might render the ink composition more susceptible to pigment flocculation, pH levels lower than about 7 are desirably avoided. When the ink composition is used in hardware with nickel or nickel-plated apparatus components, a metal-passivating anticorrosion inhibitor such as the sodium salt of 4- or 5-methyl-1-H-benzotriazole is desirably added and the pH adjusted to be from about 8.5 to about 9.2, and more desirably from about 10 to about 11. The inks of the invention are highly suitable for use with silicon-based MEMS devices that serve as printhead drop forming nozzleplates. Silicon devices comprising silicon and silicon dioxide layers are vulnerable in aqueous solutions to degradation by dissolution, especially at elevated temperatures; pH levels higher than about 10 can induce significant rates of etch and corrosion that may impair the operation of the device over time even at room temperature. When the ink composition is used with printheads with components fabricated from silicon that are in contact with the fluid, the ink composition pH is desirably adjusted to be from about 8 to about 10.0; more preferably, the pH ranges from about 8.0 to about 9.5, and most preferably about 8.5 to about 9.0. Silicon metal corrosion inhibitors to stabilize a MEMS-based jetting module nozzleplate are disclosed in World Patent Application No. 2010/138191 A1.

The ink desirably is stabilized by a buffer system. A useful buffer system is described in U.S. Patent Application No. 2010/0300428 A1. The preferred pH ranges of this embodiment of the invention direct the selection of organic amines to less basic examples of the class, many of which have pKa values that are higher than 10.0. A useful compilation of organic amines that describes their basicity and that provides many example amine pKa values is reported by J. W. Smith in Chapter 4, "Basicity and Complex Formation", of The Chemistry of the Amino Group, Patai, S., Ed., John Wiley and Sons: New York, 1968; pp 161-204. It is understood that the reported ideal aqueous solution pKa value is merely a guide, since the ink jet ink will contain organic solvents, micellar solution aggregates and colloidally dispersed solid phases that modify the solvation properties of the solvent and affect the functional acidity of the acid derived from the amine base. Further, the molar level of free base in relation to its conjugate acid will also affect the ink pH. Therefore it can fall within the scope of the invention to utilize organic amines with reported pKa values above and below the desired ink pH range.

In the preparation of a solution of polymeric dispersant for pigment milling or binder for ink preparation, the co-polymer formed following completed reaction of the monomers (following treatment with a polymerization initiator) is typically reacted with a base to deprotonate acidic functional groups on the hydrophilic polymer segments, such as carboxylic acid groups, in order to solubilize the polymer. Desirably the co-polymer is reacted with an organic base to deprotonate some or all of acidic functional groups. Inorganic bases such as potassium hydroxide, sodium hydroxide, lithium hydroxide or cesium hydroxide, can be satisfactorily used. Wet rub durability of the printed ink image can sometimes be improved by amine neutralization.

Organic amines are amines comprised of at least one organic substituent, and as employed in the invention the substituent is desirably an aliphatic group. In order to reduce the possibility of a chemical reaction of the amine with other ink ingredients, secondary amities are more preferred than primary amines. Most preferred are tertiary amines, where the neutral amine base has three organic substituents. The amine aliphatic group in turn may be substituted with any suitable functional groups that are compatible with the application of the ink jet ink. Specific examples include benzylamine, 2-phenylethylamine, N-methylbenzylamine, N,N-dimethylbenzylamine, N-propylbenzylamine, N-t-butyl-N-ethylaniline, cyclopentylamine, cyclohexylamine, N—,N-dimethylcyclohexylamine, trimethylamine, tri-n-butylamine, N,N-dimethyl-n-propylamine, N,N-dimethyl-1-butylamine, tetramethyldipropylenetriamine, pentamethyldipropylenetriamine, pentamethylenediethylenetriamine, 2,2,2-trifluoroethylamine, and 3,3,3-trifluoro-n-propylamine. Other examples include morpholine, N-methylmorpholine, N-ethylmorpholine, and dimethylpiperazine. More preferred are aliphatic amines substituted with hydroxyl groups, such as monoethanolamine, diethanolamine, 3-amino-1-propanol, N-methylethanolamine, N-benzyl-N-methylethanolamine, triethanolamine, 2-(2-aminoethoxy)ethanol, N,N-dimethyl-2-(2-aminoethoxy)ethanol, N-methyldiethanolamine, and N,N-dimethylethanolamine. Examples of aminopropanediol derivatives include 1-methylamino-2,3-propanediol, 1-amino-2,3-propanediol, 1-amino-2-ethyl-2,3-propanediol, 2-amino-2-methyl-1,3-propanediol, 2-amino-2-ethyl-1,3-propanediol, and 2-amino-2,3-propanediol.

A protic acid is used to generate a salt from the organic amine for a buffer system or to adjust ink or dispersion pH. Typical inorganic acids include boric, hydrochloric, nitric, phosphoric and sulfuric acids. Typical organic acids include methanesulfonic, acetic, proprionic, oxalic and lactic acids. Preferred are short chain aliphatic carboxylic acids, such as acetic acid and lactic acid. The pH of the final aqueous ink compositions of the invention may also be adjusted by the addition of organic or inorganic acids or bases. If a buffer system is to be formed, the acid desirably has a pKa of less than about 6.5, and preferably that is at least 2 units lower than that of the conjugate acid formed from the organic amine base, in order to ensure adequate reaction. The salt may be formed in situ during the mixing of the ink, or it may be prepared in advance as a dilute solution or even isolated as pure substance. Ideally the ink is comprised of the organic amine base and its conjugate acid in about equal molar proportions, and therefore the ratio of equivalents of amine base to equivalents of inorganic or organic acid used to form the conjugate acid of the amine base is preferably at least 1.3:1.0; more preferably it is about 1.5:1.0; most preferably it is about 2.0:1.0; and preferably it is less than about 3.0:1.0, and more preferably less than about 2.5:1.0. The ink may be comprised of at least about 0.03 mole per kg of monobasic organic amine to provide the desired buffered pH, or an equivalent-adjusted amount of multibasic organic amine reflecting the number of the participating basic amine groups. Desirably, the ink is comprised of at least about 0.06 mole per kg of monobasic organic amine to provide the desired pH with adequate buffer strength. The ink desirably has at least about 0.05 milliequivalents of strong acid titratable base, the majority of which is derived from the buffering organic amine. More than one organic amine can be used to achieve the desired ink buffered pH, and participating organic amines may be introduced into the ink composition through the addition of a neutralized polymer during the preparation of the pigment dispersion, or through the addition of a neutralized polymeric binder, as well as directly added or formed in situ during ink mixing.

The inclusion of charged molecules from dispersant, ionomeric binder polymers, pH buffer system and other functional ingredients that may be present increases the inkjet ink composition ionic conductivity considerably relative to the pure water vehicle. In preferred embodiments of CIJ printing, it is convenient to monitor ink conductivity with a resistivity cell in the fluid system path to determine if the ink component concentration has changed due to the evaporation of water during extended periods of jetting. If so, the ink is diluted with a replenisher fluid to restore the proper component concentrations and maintain critical fluid properties such as viscosity, which will affect drop formation. If the starting ionic conductivity of the ink is too low, however, the uptake of carbon dioxide from ingested air during ink recycling will produce carbonic acid and both lower the ink pH and increase the fluid conductivity significantly relative to the starting state, confounding the relation between conductivity and ink colorant concentration. Thus, in preferred embodiments of the invention, it is desirable for the ink composition to have a minimum conductivity of about 2.0 mS/cm at about 25° C., and more desirably a conductivity of at least about 3.3 mS/cm. These ionic conductivity values correspond to fluid resistivity values that are desirably less than about 500 ohm-cm, and more desirably less than about 300 ohm-cm, respectively, which will facilitate the determination of accurate estimates of ink component concentration. It is desirable that the ink resistivity not reach too low a value (or conversely that the ink ionic conductivity not reach too high a value), since it is appreciated that high ionic strength of the pigmented ink jet ink composition will potentially affect the colloidal stability of the dispersed particles, causing them to aggregate and the ink to fail. U.S. Publication No. 2005/0090599 describes the coagulation of aqueous dispersed pigmented ink particles by salt solutions at a concentration of 0.2 moles per liter. The ink resistivity is therefore desirably greater than about 50 ohm-cm, and more preferably it is greater than about 100 ohm-cm, and most preferably between about 200 and 300 ohm-cm.

A biocide may be added to an ink jet ink composition to suppress the growth of microorganisms such as bacteria, molds, fungi, etc. in aqueous inks. Useful preservatives are exemplified by alkylisothiazolones, chloroalkylisothiazolones, and benzisothiazolones. Preferred commercial products for use in an ink composition include Proxel® GXL (Arch Chemicals, Inc.) and Kordek® MLX (Rohm and Haas Co.) at a final concentration of 0.0001-0.5 wt. %.

Surface active molecules (i.e., surfactants) are added to the inkjet ink composition to adjust the surface tension of the inks to appropriate levels across all surface ages, provided that they do not compromise the colloidal stability of the pigment particles, in accord with the objects of the invention. The surfactants may be anionic, cationic, amphoteric or nonionic and be used at levels of 0.01 to 10% of the ink composition. While any agent that serves to control the surface tension at 10-ms surface age can be usefully employed as a dynamic surface tension reducing agent according to the invention, said agent preferably has a weight-normalized molecular weight below about 1,000 daltons. While the charged surfactants may have slower diffusion in aqueous inks due to the aggregated water of hydration which effectively increases their bound mass, the useful non-ionic surfactants preferably have molecular weight above 350 daltons, more preferably above 400 daltons and most preferably above 500 daltons, to ensure slow diffusion in bulk ink so as to allow distinct control of static or equilibrium inks surface tensions. It is specifically contemplated to employ mixtures of suitable surfactants for each individual ink. The distinct black, cyan, magenta and yellow ink compositions employed in the invention can be comprised of the same of different surfactants or surfactant mixtures so as to enable the desired ink physical properties. In addition adjusting surface tension profiles as a function of surface age, surfactant mixtures can facilitate the management of ink foam by being crafted to encourage foam cell drainage and rupture. Useful surfactants, their properties and the measurement of same are described in "Applied Surfactants, Principles and Applications" by T. F. Tadros, published by Wiley-VCH (2005).

Examples of suitable nonionic surfactants include, linear or secondary alcohol ethoxylates (such as the Tergitol® 15-S and Tergitol® TMN series available from Dow Chemical Company and the Brij® series from Croda International Plc.), ethoxylated alkyl phenols (such as the Triton® series from Dow Chemical Company), fluoro surfactants (such as the Zonyls® from DuPont; and the Fluorads® from 3M), fatty acid ethoxylates, fatty amide ethoxylates, ethoxylated and propoxylated block copolymers (such as the Pluronic® and Tetronic® series from BASF Corp., ethoxylated and propoxylated silicone based surfactants (such as the Silwet® series from Momentive), alkyl polyglycosides (such as the Glucopons from Cognis GmbH since acquired by BASF Corp.) and acetylenic diol polyethylene oxide surfactants (such as the Surfynol® family from Air Products and Chemicals Inc.). Additionally any conformationally asymmetric water-soluble polyoxygenated hydrocarbons enabling surface tension reduction can be employed as a surfactant.

Examples of anionic surfactants include; carboxylates (such as ether carboxylates and sulfosuccinates), sulfates (such as sodium dodecyl sulfate), sulfonates (such as dodecyl benzene sulfonate, alpha olefin sulfonates, alkyl diphenyl oxide disulfonates, fatty acid taurates and alkyl naphthalene sulfonates), phosphates (such as phosphate esters of alkyl and aryl alcohols, including the Strodex® series from Ashland Inc.), phosphonates and amine oxide surfactants and anionic fluorinated surfactants. Examples of amphoteric surfactants include; betaines, sultaines, and aminopropionates. Examples of cationic surfactants include; quaternary ammonium compounds, cationic amine oxides, ethoxylated fatty amines and imidazoline surfactants. Additional examples are of the above surfactants are described in "McCutcheon's Emulsifiers and Detergents: 2003, North American Edition". A preferred anionic surfactant is sodium dodecyl sulfate.

Dynamic surface tension (DST) reducing co-solvents as known in the art can also be employed in the black, cyan, magenta and yellow inks of the ink sets of the invention in order to achieve its objectives, where the dynamic surface tension reducing polar co-solvent agent is also considered a functional surface modifying agent (i.e., it is aptly referred to as a solvosurfactant, which is a low molecular weight, volatile solvent with an amphiphilic composition capable of reducing surface tension and of self-aggregating). On a molar and mass fraction basis, the co-solvents are less effective surface modifying agents than the traditional surfactants described above. In addition, the DST reducing co-solvents frequently can affect ink drying and dried ink redispersability properties similarly to a humectant co-solvent. By employing a distinct DST co-solvent agent in addition to a surfactant, the dynamic surface tension may be better optimized to achieve the objects of the invention. Dynamic surface tension reducing agents employed preferably comprise an asymmetric polyhydric alcohol or mono-alkyl ether derived from a polyhydric alcohol. Specific examples of lower mono-alkyl ethers derived from the polyhydric alcohols include but are not limited to ethylene glycol monomethyl ether, ethylene glycol monobutyl ether, ethylene glycol monoethyl ether acetate, diethylene glycol monomethyl ether, diethylene glycol monobutyl ether, triethylene glycol monobutyl ether, polyethylene glycol monobutyl ether, propylene glycol monomethyl ether, propylene glycol monopropyl ether and diethylene glycol monobutyl ether acetate, among others all as supplied as the Dowanol®, Cellusolve® and Carbitol® series from Dow Chemical Co. Specific examples of lower asymmetric polyhydric alcohols include but are not limited to: 1,2-butanediol, 1,2-pentanediol, 1,2-hexanediol, 1-phenyl-1,2-ethanediol, 1,2,6-hexanetriol, 1,2-heptanediol, 1,2-octanediol, and 1,3-hexanediol. Useful dynamic surface tension reducing co-solvent agents also include diols such as 1,6-hexanediol, which conformationally folds back on itself in aqueous solution and functionally acts in an asymmetric manner to reduce surface tension at short times.

The useful DST co-solvent agents have molecular weights below 350 daltons, more preferably below 280 daltons and most preferably below 210 daltons to ensure fast diffusion of the agent in the bulk ink so as to be in distinct control of the 10-ms surface age surface tension critical to effective practice of the invention. Conversely, the useful DST co-solvent agents of the invention also preferably have a molecular weight of greater than 76 daltons and more preferably greater than 90 daltons. This minimal molecular weight serves to ensure that the DST agent does not evaporate from the ink on extended storage and that the DST agent exhibits a Flash Point of over 96° C. as appropriate for a consumer or industrial product designed for aqueous fluid use and not for solvent vehicle use. The lower limit on molecular weight and volatility further ensures that the DST co-solvent agent is present and active in the ink composition after jetting and while the ink is drying on the plain paper or glossy printing medium surface. Further, the useful DST agents have melting points below the typical operating temperature of the intended printer system to avoid the formation of crystalline deposits on the printhead or in the maintenance system. Practically, this means that the useful DST agents have melting points below 300° C., preferably below 200° C. and more preferably below 100° C.

Defoaming agents and antifoaming agents comprised of phosphate esters, polysiloxanes, or acetylenic diols are optionally used with the ink compositions directed at CIJ to minimize foam formation caused by the fluid agitation associated with drop catching and ink recirculation, especially when polymeric dispersants or binders are present, or when the at least one DST-reducing surfactant stabilizes foam. The defoaming or antifoamant agents desirably do not contain particles despite their effectiveness in the rapid destabilization of ink foam due to the requirements of recirculating filtration. Defoaming or antifoamant additives may reduce 10-ms DST themselves, and may be used alone or in mixtures with other surfactants to manage surface tension age profiles according to the objects of the invention. Especially useful dynamic surface tension reducing surfactants include the lower molecular weight gemini-type acetylenic dialcohols such as 2,5,8,11-tetramethyl-6-dodecyne-5,8-diol and 2,4,7,9-tetramethyl-5-decyne-4,7-diol classified as Chemical Abstracts Registry Nos. (CASRN) 68227-33-8 and 126-86-3, respectively, and the latter's polyalkylene oxide derivatives, that is, the ethoxylated acetylenic diols classified as CASRN 9014-85-1 and available commercially among the Surfynol® surfactant family. Preferred ethoxylated acetylenic diols have a weight average molecular weight of about 370 to about 1200 daltons with a polydispersity of about 1.02 to 1.04. Especially preferred ethoxylated acetylenic diols have a weight average molecular weight of about 490 with a polydispersity of about 1.02 to 1.04. It is particularly useful to combine low hydrophile-lipophile balance (HLB) acetylenic diols that excel at foam suppression with higher HLB ethoxylated derivatives that are superior dynamic surface tension modifiers to manage DST profile and ink foam simultaneously.

Acceptable static surface tensions for inks of the invention are typically no greater than 60.0 mN/m, and preferably are above 20.0 mN/m. The static surface tension of the inks useful in the invention is desirably greater than about 25.0 mN/m, is more preferably greater than about 30.0 mN/m, and is most preferably greater than 35.0 mN/m. The 10-ms surface age surface tension of the inks useful in the invention is less than 54 mN/m, more preferably less than or equal to about 53 mN/m, more preferably less than or equal to about 51 mN/m, more preferably less than or equal to about 50.0 mN/m, more preferably less than or equal to about 48.0 mN/m and most preferably less than or equal to about 45.0 mN/m to achieve the most robust printing and the largest operating margin for use in continuous inkjet printers employing deflection air flows. It is preferred that the 10-ms surface tension exceeds 30 mN/m, and more preferably 35 mN/m in order to minimize liquid ink coalescence, possible intercolor bleed, and feathering on the freshly printed substrate that would reduce print image quality.

The black, cyan, magenta and yellow ink compositions of the inkjet ink sets of the invention further can include one or more water-soluble or polar organic compounds to serve as an humectant (also called a co-solvent) if desired in order to provide useful properties to the inkjet ink, distinct from the at least one 10-ms dynamic surface tension reducing surfactant. Typical useful properties of humectant and co-solvent additives include, but are not limited to, preventing the ink composition from drying out or crusting in the nozzles of the printhead by reducing the rate of water evaporation and plasticizing the pigment cake as the ink dries; aiding the solubility of the components in the ink composition; facilitating redispersion of concentrated or dried ink in ink or CIJ cleaning fluid; modifying the fluid surface tension either directly (e.g., by reducing the chemical activity of water and surface energy at the liquid-solid or liquid-gas interface) or indirectly (e.g., by modifying the availability of surfactant in an aqueous phase); altering the fluid viscosity; aiding firing properties of the ink from an ejector; facilitating penetration of the ink composition into the image-recording element after printing; aiding gloss; and suppressing mechanical artifacts such as paper cockle and curl during and after printing. Organic humectant and co-solvent compounds can have the potential, depending on chemical composition and structure, to modify aqueous fluid surface tension at high surface ages or also at short surface ages (i.e., the additives can be solvosurfactants as identified in the description of useful surfactants). If suitable, the one or more water-soluble humectants (co-solvents) may constitute said at least one 10-ms dynamic surface tension reducing surfactant providing it can modify such surface ages sufficiently at acceptable ingredient levels. While the at least one 10-ms modifying surfactant that is selected may provide some of these properties, by employing at least one additional humectant (co-solvent) distinct from the dynamic surface tension modifying surfactant, the humectant and redispersability requirements, the solubility requirements, and surface tension requirements for the inkjet ink compositions of the inventive ink sets may be better controlled.

Any water-soluble humectant or co-solvent known in the inkjet art and compatible with the other requirements of the invention can be employed. By water-soluble is meant that a mixture of the employed humectant(s) or co-solvent(s) and water is adequately homogeneous and not subject to spontaneous phase separation. While an individual humectant or co-solvent can be employed, useful inkjet ink compositions can employ mixtures of two, three or more humectants and co-solvents, each of which imparts a useful property to the inkjet ink. Representative examples of humectants and co-solvents used in aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, di(ethylene glycol), tri(ethylene glycol), tetra(ethylene glycol), propylene glycol, di(propylene glycol), the poly(ethylene glycol)s with average molecular weights ranging from 200 to about 5000 daltons (particularly poly(ethylene glycol)-400 (average Mn ca. 400, herein referred to as PEG-400 for convenience)), the polypropylene glycols with average molecular weights ranging from 200 to about 5000 daltons (particularly poly(propylene glycol)-425 (average Mn ca. 425)), 1,2-propanediol, 1,3-propanediol, 1,2-butanediol, 1,3-butanediol, 1,4-butanediol, 1,2,4-butanetriol, 3-methyl-1,3-butanediol, 2-methyl-1,3-propanediol, 1,5-pentanediol, 1,6-hexanediol, 2-methyl-2,4-pentanediol, 1,7-heptanediol, 2-ethyl-1,3-hexanediol, 2,2,4-trimethyl-1,3-pentanediol, 1,8-octanediol, glycerol, 1,2,6-hexanetriol, 2-ethyl-2-hydroxymethyl-propanediol, 2-methyl-2-hydroxymethyl-propanediol, saccharides and sugar alcohols and thioglycol; (3) polyoxygenated polyols and their derivatives such as diglycerol, polyglycerols, glycerol ethoxides, glycerol propoxides, glyceryths, alkylated and acetylated glyceryths, saccharide such as sorbitol or fructose, pentaerythritol, pentaerythritol ethoxides, and pentaerythritol propoxides and their alkylated and acetylated derivatives; (4) aliphatic or aromatic glycol ethers such as an aromatic glycol ether like propylene glycol phenyl ether (e.g., Dowanol™ PPh glycol ether) or aliphatic glycol ether such as propylene glycol methyl ether (Dowanol® PM), di(ethylene glycol) n-butyl ether (Butyl Carbitol™) or poly(ethylene glycol) methyl ether (average M, ca. 550); (5) nitrogen-containing compounds such as N,N-dimethylformamide, acetamide, N-methylacetamide, NN-diethylacetamide or morpholine urea, urea, 2-pyrrolidone, N-methyl-2-pyrrolidone, imidazolidinone, N-hydroxyethyl acetamide, N-hydroxyethyl-2-pyrrolidinone, 1-(hydroxyethyl)-1,3-imidazolidinone, 1,3-dimethyl-2-imidazolidinone, and 1,3-dihydroxy-2-imidazolidinone; or polyvinylpyrrolidone; (6) sulfur-containing compounds such as 2,2'-thiodiethanol, dimethyl sulfoxide and tetramethylene sulfone; and (7) water soluble N-oxides such as 4-methylmorpholine-N-oxides. As used herein in reference to inkjet ink compositions for use in a continuous ink jet printer, particularly desirable ingredients serving primarily as a humectant to retard ink drying and aid ink redispersability include glycerol, ethylene glycol, related polyols, and the polyhydric alcohol derivatives thereof, which are preferred; glycerol is especially preferred. The polyhydric alcohol derivatives of glycerol include the glycerol ethoxides, glycerol propoxides and glyceryths. It is recognized that the effectiveness of the humectant in accomplishing water retention and wetting will depend on its chemical structure. When the humectant chemical structure produces lower water retention, higher levels of the humectant can be used without adversely affecting the drying rate of the printed ink. When the humectant or co-solvent chemical structure produces minimal effect on surface tension at any surface age, higher levels of the humectant can be used without adversely affecting desired dynamic surface tension profile of the ink. The useful humectants, co-solvents and solvosurfactants have melting points below the typical operating temperature of the intended printer system to avoid the formation of crystalline or amorphous insoluble deposits on the printhead or in other segments of the fluid, drop formation and deflection systems. Practically, this means that the useful humectants, co-solvents and solvosurfactants have melting points below 300° C., preferably below 200° C. and more preferably below 100° C.

While any quantity of water soluble humectants and polar co-solvents either singly or in combination with dynamic surface tension reducing co-solvents and surfactants can be employed, the total humectant and co-solvent level of the ink jet ink composition for continuous ink jet printing is desirably from about 1 to about 20% by weight and more preferably less than 10% by weight. The total humectant and co-solvent level of the ink is the sum of the individual contributions of humectant or miscible polar organic co-solvent, DST-modifying co-solvent (solvosurfactant), the said at least one 10-ms surface tension modifying surfactant, if it sufficiently water soluble to provide humectant or co-solvent functionality by means of its chemical structure and properties, and any other co-solvent ingredients, which may include humectant or organic co-solvent added directly or incidentally during the totality of ink formulation (for example, co-solvent associated with a commercial biocide preparation as a supplemental ingredient, or with a commercial pigment dispersion preparation that may be present to prevent so-called "paint-flakes" of dried pigment cake forming around a bottle cap, as described in U.S. Publication No. 2005/0075415 to Harz et al). More desirably, the total humectant and co-solvent level is less than or equal to about 10% by weight and yet more desirably less than or equal to about 8% by weight, in order to facilitate drying of the ink jet printing recording material in a high speed printer, and at least about 2% and more preferably at least about 4% by weight to encourage higher equilibrium moisture content in dried ink film on hardware for redispersion and clean-up by ink, or by start-up and shut-down fluids, or by a printhead storage fluid.

The inclusion of many functional ingredients in the inkjet ink composition can increase the fluid's viscosity. It is desirable to limit the ink dynamic viscosity in order to provide better drop formation and to reduce the fluid system pressure drop at the nozzleplate to less than about 100 psid for the convenience of fabrication and operation. It is preferred that the ink dynamic viscosity is less than about 5 mPa-s; more desirably, the ink viscosity is less than about 3 mPa-s, and still more desirable is to limit the ink viscosity to less than about 2 mPa-s. For simple marking applications requiring low ink functionality, it is most desirable to limit the ink viscosity to less than 1.5 mPa-s.

As described above, in accordance with various embodiments of the invention, ink static and dynamic surface tensions are controlled so that a black ink, and all inks of an ink set, can provide high quality prints with the desired operating margin when printed with a continuous inkjet printer. Ink surface tensions in accordance with the invention and ink viscosity are determined according to the following methods.

Dynamic Viscosity Measurement:

Ink viscosity can be measured by any of a large number of well known techniques. Preferred methods include measurement of the timing of mass flow through a capillary as in a capillary viscometer, or measurement of ball drop velocity through a fluid, using for example a rolling ball viscometer. Both a capillary flow viscometer and a commercially available Anton Paar Automated Micro Viscometer (AMVn) employing the rolling ball technique were used to measure the dynamic viscosities reported herein. All ink dynamic viscosity values disclosed herein were measured under gravity induced shear at approximately 24° C. to 26° C. It will be appreciated that the values cited are reported as milliPascal seconds (mPa-s) and that 1 cP=$10^{-3}$ Pascal-seconds (Pa-s)= $10^{-2}$ dyne-s/cm$^2$. While viscosities can be measured with high precision, viscosity values here are reported to one or two decimal places only, and they are normally rounded values and not truncated values. All claims reciting ink viscosities are intended to be interpreted in terms of values in mPa-s normally rounded to one decimal.

Static Surface Tension Measurement:

The Wilhelmy plate method is a well known technique for measuring the static surface tension of a liquid at a solid interface. The technique involves a plate of known dimensions, typically selected from a roughened platinum alloy, suspended from a balance. The plate is contacted with a solution of interest and a vertical force is applied to the plate to form a liquid meniscus between the solution and plate. The resulting surface tension is given according to equation (1):

$$\sigma = F/L \cos(\theta) \quad (1)$$

where $\sigma$ is the surface tension of the liquid, F is the force acting on the balance (milli-Newtons/meter), L is the wetted length of the plate in millimeters, and $\theta$ is the contact angle between the plate and solution.

Typically, the roughened platinum results in a contact angle very close to zero and the cosine of $\theta$ goes to 1. A complete theoretical treatment of the method can be found in, for example, "A Method for Determining Surface and Interfacial Tension Using a Wilhelmy Plate", Colloid and Polymer Science, 255(7), pages 675-681. A number of commercially available instruments are known for measuring surface tension, however, the instrument used to report surface tension values in the present invention is a Krüss Model K10ST tensiometer.

Dynamic Surface Tension Measurement:

Dynamic surface tension is a well known property and there are several techniques are known for measuring dynamic surface tension. The technique used to measure dynamic surface tension of the inventive ink and ink sets herein is called the maximum bubble pressure method. The technique is described in detail in several publications including, "The Measurement of Dynamic Surface Tension by the Maximum Bubble Pressure Method", Colloid and Polymer Science, vol. 272, pages 731-739, 1994.

The operating principle behind the maximum bubble pressure method involves a stream of air being directed through a narrow circular cylindrical capillary where the capillary is submersed into the solution of interest, here an inkjet ink. The air stream forms an air bubble as it exits the capillary and is forced into the ink solution. The surface tension of the ink is determined by use of equation (2):

$$\Delta P = P_b - P_s = 2\sigma/R \quad (2)$$

where $P_b$ is the pressure inside the air bubble, $P_s$ is the pressure in the surrounding solution, $\sigma$ is the surface tension of the ink and R is the radius of the air bubble. At the point where the radius of the bubble, R is equal to the radius of the capillary, r, the pressure in the bubble will be at its maximum and equation (2) can be written as (3):

$$\sigma = \Delta P_m r/2 \quad (3)$$

where $\Delta P_m$ is the maximum difference in pressure between the inside and outside of the bubble. Beyond this maximum pressure the bubble will detach from the capillary and the process will begin again. The process of bubble formation may be controlled such that the frequency of bubble formation is changed from very a rapid frequency to a relatively slow frequency. This rate of bubble formation is related to the surface age lifetime of the air bubble in the solution. For example, the bubble frequency may be changed so that surface lifetimes from about 10 milliseconds to about 50,000 milliseconds are achieved. As a result, a plot of dynamic surface tension versus time (age of surface life) can be generated. A number of commercially available instruments are known for measuring surface tension, however, the instrument used to report dynamic surface tension values in the present invention is a Krüss BP-2 bubble tensiometer. All ink surface tension values disclosed here are reported at 24° C. to 26° C.

It will be appreciated that the surface tension values cited are reported as milliNewtons/meter (mN/m), and that 1 mN/m=1 dyne/cm. While surface tensions can be measured with high precision, surface tension values here are reported to one or two decimal places only, and, they are normally rounded values and not truncated values. All claims reciting surface tensions are intended to be interpreted in terms of values in mN/m normally rounded to one decimal.

Continuous ink jet printing has needs for improved ink compositions and printing methods to satisfy market demands for high printed optical density, color fidelity, image stability, print durability to fade and abrasion, and waterfastness. High-speed continuous ink jet printing is used in commercial market applications and generally involves printing variable information for transactional documents such as invoices and credit card billing statements, and also scratch-off lottery tickets. Variable-data imprinting sub-systems, sometimes referred to as print stations, consist of a sub-systems that include a printhead, control electronics, an ink reservoir, an ink pump and an ink delivery system, and they can be added to an existing high-speed press system for black text or other single color printing in labeling or mailing applications. Commonly used dye-based inks can provide adequate optical density on the normal mix of paper substrates, such as plain bond papers, surface-treated papers, or coated and calendared business gloss papers or heavy-stock covers. Dye-based inks, however, suffer poor waterfastness on all substrates, and low durability on glossy papers against wet rub abrasion that can render text and universal packaging code information illegible. Self-dispersed carbon black pigment-based ink compositions lacking a film-forming polymer binder offer high optical density on untreated bond papers that approach electrophotographic-printing quality, with visual optical density values of about 1.4. The colorant, however, is readily redispersed by wet rub abrasion, resulting in undesirably low durability and smear. Polymer-dispersed carbon black pigment ink compositions of the art offer excellent waterfastness, wet rub durability, and dry rub abrasion on all substrates, but optical density suffers on plain papers, where the colorant apparently wicks along the cellulose fibers into the interior of the paper, leading to grayish appearing printed text. Durable carbon black pigmented ink jet compositions adaptable to continuous ink jet ink formulation and printing are described in US Publication No. 2007/0043146, incorporated by reference above. A continuous ink jet printing ink composition comprised of carbon black pigment and an associated water soluble polymer resin is described in EP 0 853 106 to Thakkar et al., in U.S. Pat. No. 6,203,605 to Thakkar et al., and in U.S. Pat. No. 5,512,089 to Thakkar.

The durability, gloss, and other properties of a printed ink jet image can be improved by the application of a (preferably colorless) polymeric overcoat ink composition, as disclosed, e.g., in U.S. Pat. No. 7,219,989 B2 to Uerz et al., the disclosure of which is incorporated herein by reference in its entirety. In order to achieve the high printer speeds and throughput associated with continuous ink jet web printing, an overcoat composition can be applied using a continuous ink jet printer printhead following in line one monochrome continuous inkjet printer linehead of drop-forming nozzles, providing for a monochrome imprinter system or a monochrome printing press with improved printed image properties. Alternatively, an overcoat composition can be applied using a continuous ink jet printer printhead in line with multiple continuous inkjet printer lineheads of drop-forming nozzles, providing a multicolor ink jet imprinter system or a multicolor printing press, desirably a full color press, with improved printed image properties. The drop size, addressability, and printed resolution of the overcoat composition are not required to be the same as the printed ink jet inks, and differing continuous inkjet printhead technologies could be used, as long as the firing speed and paper transport speed requirements were met.

Replenisher fluids for use with an ink according to the invention may be comprised exclusively of water, and preferably the water is completely deionized in order to avoid the accumulation of conductive inorganic salts in the replenished ink. Desirably, the aqueous replenisher fluid contains a biocide to suppress the adventitious growth of microscopic organisms. Preferred commercial products for use in a replenisher composition include Proxel® GXL (Arch Chemicals, Inc.) and Kordek® MLX (Rohm and Haas Co.) at a final concentration of 0.0001-0.5 wt. %. The resistivity of the replenisher fluid desirably exceeds 5,000 ohm-cm, and more desirably exceeds about 200,000 ohm-cm.

Figure 4:
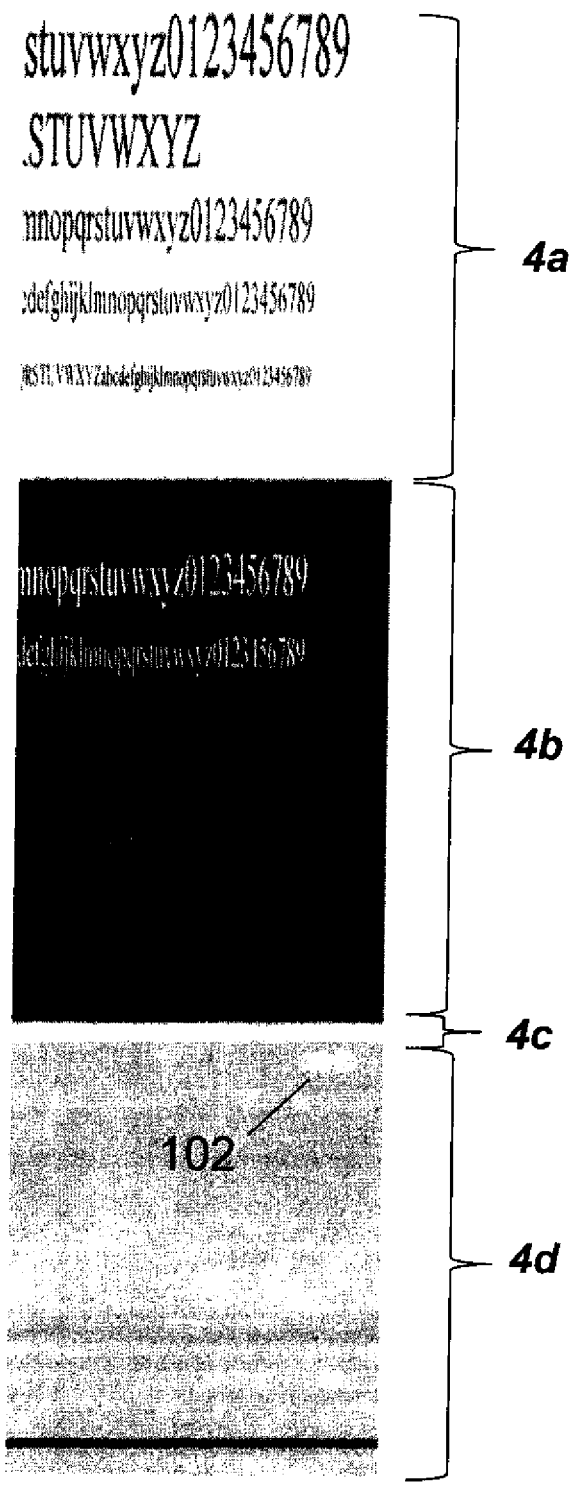
FIG. 4 is a printed diagnostic target image revealing PO defect following specific sequential transitions in ink delivery to the substrate from 100% coverage to 0% coverage preceding an affected printed patch.

Referring to FIG. 4, shown is a print of a sample target conveniently used to evaluate printing performance. The first section, 4*a*, is a typical section of text with limited coverage. The second section, 4*b*, shows an area of high coverage. The third section, 4*c*, shows an area with no coverage, and the last section 4*d* shows an area of 25% coverage. The target is printed in such a way that the first section, 4*a* is printed first, and the last section 4*d* is printed last. When such a target is printed at maximum rated speed with previously available commercial black and some color CU formulation inks, a print defect known as pick out (PO) 102 (shown in section 4*d* of FIG. 4) may result. Such defect has been determined to result from a transition condition of the ink film on the gutter catcher face as a result of printing such a target, as can be seen in FIGS. 5*a*-5*d*, which correspond to the sections 4*a*-4*d* of the sample target shown in FIG. 4.

FIGS. 5*a*-5*d* are based on observations upon examination of the drop stream in the deflection zone of the drop flight path of a continuous inkjet printer of the type generally depicted in FIGS. 2 and 3 (i.e., employing bi-modal drop size drop generation and air deflection in a large drop print mode) under printing conditions in the laboratory using a microscope with stroboscopic illumination, which revealed the physical origin of the problem of loss of print margin related to the volume of ink fluid flowing down the Coanda gutter 42. At relatively low printing speed (e.g., 100 FPM), a black patch image (100% ink) will still cause the generation of a large number of non-printing drops to form during the time interval required for the next print drop. The non-printing drops are deflected to the Coanda gutter catcher face producing a significant liquid ink film that is subject to only minor fluctuations in overall fluid volume, as the image pattern changes from white (0% ink) to black (100% ink). The fluid layer remains relatively uniform in height, providing adequate clearance between it and the stream of print drops in flight toward the paper substrate. At relatively higher transport speed (e.g., 650 FPM), just one non-printing drop separated consecutive printing drops in a solid black (100% ink) image. The catcher face was subject to a much greater range of fluid volume differences between black and white images, and the fluid height on the solid gutter surface varied more severely accordingly. Furthermore, with abrupt changes in the image pattern, transient fluid flows formed, functionally like waves, that resulted in momentary extreme fluid heights on the gutter surface. The wave height was sufficient to block the trajectory of the oncoming print drop, resulting in the PO defect. The obstruction of printing drops abated as soon as the fluid wave moved onward and the fluid film relaxed into its equilibrium height, as it flowed down the catcher face into the vacuum return line. Adjustment of the 10-ms dynamic surface tension of the printing fluid to a value of less than 54 mN/m in accordance with the present invention provides an improvement in the transient fluid properties of the ink composition residing on the catcher face under dynamically changing printing conditions, enabling normal print image quality and useful printhead operating margin at full printing speeds.

The problem to which the present invention is particularly addressed is further illustrated in FIGS. 4 and 5*a*-5*d*. Referring specifically to section 4*a* of FIG. 4 and corresponding FIG. 5*a*, in an area of light coverage such as the text shown, an ink film 100 forms on the front face 90 of the catcher 42. During the printing of an area similar to section 4*a* in FIG. 4, this ink film is relatively stable based upon a consistent ink loading from the small drops 54 on the small drop trajectory 66 impacting the front face 90. The ink film in FIG. 5*a* would be described as thick because there are just a small percentage of large drops 56 being demanded by the image. As a result, the larger percentage of the drop stream 58 are small drops, which causes a thick ink film 100.

Figure 5A:
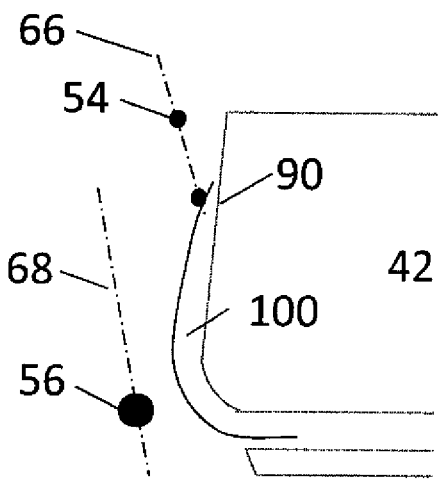
FIGS. 5a-5d are schematic views of the trajectory of the printing and non-printing ink drops in relation to the catcher face wetted with a layer of ink that is sequenced to the printed image sections in FIG. 4, and which illustrates the changes in fluid thickness on the catcher in response to the instantaneous printing conditions.
Figure 5B:
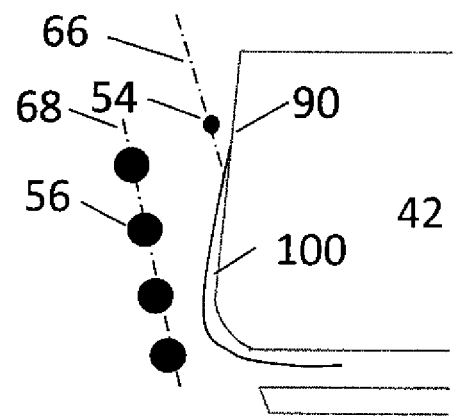

Referring now to section 4*b* of FIG. 4 and corresponding FIG. 5*b*, in an area of heavy coverage such as the reverse text shown, the reverse scenario of ink loading is seen on the front face 90 of the catcher 42. In this case, the majority of drops 56 are directed to the media along trajectory 68, leaving very few drops 54 impacting the catcher face 90. As a result, the ink film 100, having a small amount of liquid 52, becomes thin.

Figure 5C:
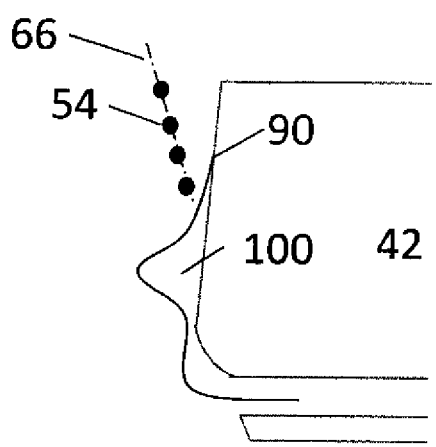

As shown in section 4c of FIG. 4 and corresponding FIG. 5c, a transition to an area of no printing in which all of the small drops 54 impact the front face 90 will cause a transient wave to form in the ink film 100. When the length in the in track page direction of this area of no printing is relatively small, the condition shown in FIG. 5d may be created.

Figure 5D:
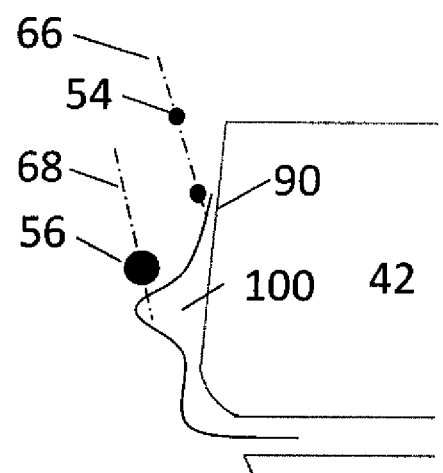

In FIG. 5d, the section 4d of the image as shown in FIG. 4d demands a light coverage of printing. As such, large drops 56 are created and presented along the large drop trajectory 68. In this case, the wave in the ink film 100 generated through the transition condition described in FIG. 5c is still present. This wave in the ink film 100 intercepts the desired large drop 56 and prevents it from impacting the recording media 32. The resulting print defect known as pick out (PO) 102 is shown in section 4d of FIG. 4.

The invention provides inkjet ink compositions which minimize the size of ink film waves, which interfere with large print drop flight to the substrate. When 10-ms dynamic surface tension is reduced in accord with the invention, print margin is desirably increased and PO defect is minimized or eliminated entirely. Without being bound by any specific theory, the reduction of printing fluid 10-ms dynamic surface tension to less than about 54 mN/m seemingly reduces the maximum ink film wave height. The use of surface active molecules in an appropriate concentration that are capable of affecting the fluid surface tension at very short surface ages in accord with objects of the invention establishes the potential to form surface tension gradients normal to the surface as the surface ages during flow down the catcher face; in addition, the formation and travel of a wave down the catcher face will further contribute to gradients forming tangentially in the presence of such surface active molecules. Surface tension gradients generate hydrodynamic stresses, or fluid pressures, that induce the flow of fluid and are sometimes referred to Marangom flows, and which serve to suppress surface motion. The outcome is an increase of the effective elasticity of the fluid surface during transient flooding of the catcher face while printing high dynamic range images, which significantly reduces the maximum transient wave height. Previously lost print margin at a higher print speed is restored by providing physical clearance between the ink film and the large print drop trajectory.

The invention further provides a printing method which maximizes the utilization of theoretical printing system speed capability before print defect levels (e.g., PO) become prohibitive in frequency. In an exemplary 600 dpi printing system with the capability to generate non-printing small drops 54 at a drop formation rate of 400 kHz (600×600 addressability), and large printing drops 56 with three times the volume at 133 kHz, the theoretical maximum printing speed is 1,111 FPM. This value is calculated as follows in equation (4):

(133,000 dots/s)(60 s/min)(1 in/600 dots)(1 ft/12 in)=1,111 FPM    (4)

As a first example, when printing a black 100% coverage patch for a long enough duration at the maximum theoretical speed, there is the potential to completely eliminate the ink film 100 from the front face 90. Conversely, when one prints a white 0% coverage at any speed, the front face 90 must capture all of the liquid ejected by the jetting module 48 generating the maximum steady state ink film thickness. These two extremes present the worst case print margin scenario to the system.

As another example, take the case where the same printing system with a maximum print speed of 1,111 FPM is printed at 555 FPM which is ½ the maximum theoretical speed. A black 100% coverage will still only use ½ the number of available print drops 56. As a result, the ink film 100 on the front face 90 will never be eliminated as was the case in the previous example. When printing at fractions of the maximum print speed, the deviations in ink film thickness are correspondingly reduced. In addition, the potential for the transient waves as shown in FIGS. 5c and 5d is similarly reduced. The method of printing according to the invention provides the most benefit to printing systems when they print at a substantial percentage of their theoretical maximum printing speed, based on pixel addressability and drop formation frequency. In accord with the method of printing of the invention, it is preferred to print at a transport speed of at least 50% of the theoretical maximum system speed; it is more preferred to print at 75% or higher of the theoretical maximum system speed; and it is most preferred to print at 90% or higher of the theoretical maximum system speed capability in order to best enjoy the benefits of the invention.

EXAMPLES

The suffix (c) designates control or comparative ink jet ink compositions, while the suffix (e) indicates example ink jet ink compositions. The abbreviation "Wt %" indicates the ingredient weight percent. Carbon black pigment dispersion content is based on the weight percent of carbon black.

Preparation of Continuous Ink Jet Ink Samples

Polymeric Dispersant and Additive Preparation
Polymeric Dispersant P-1

In a representative procedure, a 5-liter, three-necked round bottom flask equipped with a mechanical stirrer, a reflux condenser, and a gas inlet was charged with 225 g of 1-methoxy-2-propanol and was sparged with nitrogen. Akzo-Nobel Chemicals, Inc., initiator Perkadox AMBN-GR (1.9 g) was added with stirring. A reactant reservoir was charged with 225 g of 1-methoxy-2-propanol, 23.4 g of 1-dodecanethiol, 203.5 g of benzyl methacrylate, 165.0 g of stearyl methacrylate, and 181.5 g of methacrylic acid, and the solution was degassed by nitrogen sparging. AMBN-GR (7.7 g) was added and mixed in. The reactor temperature was raised to 77° C. and the reactants were pumped from the reservoir at a about 2.3 mL/min over a 360-min period. The reaction mixture was stirred for at least 12 h at about 77° C. The polymer was neutralized to completion with dimethylaminoethanol and stirred for 45 min. The reaction mixture was diluted with 2,580 g of water and filtered through a Pall Corp. Ultipleat polypropylene cartridge filter. The final polymer solution had a concentration of ca. 20 wt. % solids and its pH was 8.6. The average the weight average molecular weight was 9,070 daltons.
Polymeric Dispersant P-2

Polymeric dispersant P-2 was prepared in a similar fashion to P-1, except that 90% of the acid was reacted with potassium hydroxide during the neutralization step instead of with one equivalent of dimethylaminoethanol.
Polymeric Additive P-3

A benzylmethacrylate-methacrylic acid co-polymer of monomer weight ratio 77:23 and acid number of about 137 was 90%-neutralized with potassium hydroxide to provide an aqueous solution.

Polymeric Additive P-4

BASF Dispersions & Pigments North America Joncryl® HPD 696, which is a styrene acrylic co-polymer having a weight-normalized molecular weight Mw of 16,000 daltons was 90%-neutralized with potassium hydroxide to provide an aqueous solution.

Pigment Dispersion Preparation

Pigment Dispersion KD-1

To a 2.5-gallon, 9-inch diameter and 12-inch deep, double-walled stainless steel mixing vessel containing four baffles is added water (1,000 g) and a solution of Polymeric Dispersant P-1 (1,000 g of a 19.9 wt % solution). A nominal 4-inch, ring-style disperser impeller (Hockmeyer Equipment Corp. D-Blade) driven by a Charles Ross & Son Co. Model HSM-100LH-2 High Shear Mixer is centered 2 inches above the bottom of the mixing vessel, and stirring is initiated. Evonik Degussa Corp. NIPex® 180 IQ carbon black pigment (500 g) is slowly integrated into the fluid. Milling media comprising beads of polystyrene resin (copolymer of styrene and divinylbenzene/ethylvinylbenzene mixture) with an average particle diameter of 50 micrometers (3,000 g) is added slowly while increasing impeller speed. The mixture is milled with an impeller blade tip speed of ca. 19 msec for about 20 h at an internal temperature of 25-35° C. Samples are periodically removed, diluted and filtered for particle size determination by a Microtrac, Inc., Nanotrac® 150 dynamic light scattering analyzer. When milling is complete, the dispersion/media milling mixture is further diluted with a solution of water (2,475 g) and Rohm and Haas Co. Kordek™ MLX preservative (25 g) to a final pigment concentration of about 10%, a polymeric dispersant concentration of 4.0% including the counterion, and a theoretical dispersion batch size of 5000 g. The impeller is removed and the milling media filtered off. A final filtration through a 0.3-micrometer removal efficiency Pall Corp. Profile II® depth filter gave roughly 4 kg of dispersion, approximately 80% yield. The volume-weighted $50^{th}$ percentile particle size distribution diameter is about 60 nm, and the $95^{th}$ percentile particle size distribution diameter is about 105 nm as characterized by a Microtrac Inc. Nanotrac NPA 150 dynamic light scattering particle sizing instrument.

Pigment Dispersion MD-1

Magenta pigment dispersion MD-1 is prepared in a similar manner to pigment dispersion KD-1, except that Cromophtal® Jet Magenta 2BC is used in place of carbon black pigment. The resulting dispersion has approximately 10% pigment and 5.0% polymer dispersant, including the counterion. The vol. weighted median particle size is 15 nm as characterized by a Microtrac Inc. Nanotrac NPA 150 dynamic light scattering particle sizing instrument.

Pigment Dispersion CD-1

Cyan pigment dispersion CD-1 was prepared in a similar manner to pigment dispersion KD-1, except that Sun Chemical Co. Sunfast® Pigment Blue 15:3 is used in place of carbon black pigment. The resulting dispersion has approximately 10% pigment and 5.6% polymer dispersant, including the counterion. The vol. weighted median particle size is 21 nm as characterized by a Microtrac Inc. Nanotrac NPA 150 dynamic light scattering particle sizing instrument.

Pigment Dispersion CD-2

Cyan pigment dispersion CD-1 is prepared in a similar manner to pigment dispersion KD-1, except that Pigment Blue 15:4 and Pigment Green 7 are used in a ratio of 3.75:1 in place of carbon black pigment and polymeric dispersant P-2 is used in place of P-1 in the presence of Lubrizol Corp. Solsperse® 12000 and Polymer P-3. The resulting dispersion has approximately 10% pigment and 3.4% polymer dispersant, including the counterion. The vol. weighted median particle size was 44 nm as characterized by a Microtrac Inc. Nanotrac NPA 150 dynamic light scattering particle sizing instrument.

Pigment Dispersion YD-1

To a 10-gallon, 13-inch diameter and 17-inch deep, double-walled stainless steel mixing vessel containing four baffles was added 2,560 g water and 2,400 g of a 15% solution of Polymer P-2. A nominal 6-inch, ring-style disperser impeller (Hockmeyer Equipment Corp. D-Blade) driven by a Hockmeyer Model HBI-7.5-11-99 High Shear Mixer was centered 3 inches above the bottom of the mixing vessel, and stirring was initiated. Sun Chemical Co. Pigment Yellow 74 (1,200 g) was slowly added to the fluid. Milling media comprising beads of polystyrene resin (copolymer of styrene and divinylbenzene/ethylvinylbenzene mixture) with an average particle diameter of 50 micrometers (7,200 g) was added slowly while increasing impeller speed. The mixture was milled with an impeller blade tip speed of ca. 20 meter/second for about 20 hours at an internal temperature of 25-30° C. The dispersion/media mixture was further diluted with water (5,940 g) and biocide Kordek™ MLX (Rohm and Haas Co.) (60 g) to a final pigment concentration of about 10% and polymer P-2 concentration of about 3.4%. The impeller was removed and the milling media filtered off. A final filtration through a 0.3-micrometer Pall Corp. Profile II® depth filter yielded roughly 10.6 kg of dispersion. The dispersion had a median particle size of 80 nanometers in Intensity mode as characterized by a Microtrac Inc. Nanotrac NPA 150 dynamic light scattering particle sizing instrument.

Preparation of Continuous Inkjet Ink Compositions

The abbreviation "wt %" indicates the ingredient level in percent by weight. Carbon black pigment dispersion content is based on the weight percent of carbon black.

Black Pigmented Inks

Black pigmented continuous inkjet ink composition Ink K-A was prepared from the pigment dispersion KD-1 by combining the ingredients at the relative proportions reported in Table I. In a representative procedure, 15.0 kg of inkjet ink is prepared by adding the components individually to a 30-liter cross-linked, high density polyethylene flat bottom tank using a 2-inch impeller rotating at ca. 1,000 rpm in order to provide good mixing. The ingredients are added in the following functional component order: water, amine-acid salt solution, humectant, amine base, corrosion inhibitor, biocide, soluble azo dye, pigment dispersion, surfactant, and antifoamant. The ink composition is mixed for about 2 minutes between ingredient additions, and then it is stirred for 1 hour after the addition of the antifoamant. The ink composition is filtered through Pall Corp. 0.2 micrometer effective pore size Ultipor® N66 cartridge filter media at a rate of about 0.5 L/min/inch of media.

Ink Bases K-B and K-W were prepared in an analogous manner according to the proportions of ingredients in Table 1, except that the inkjet ink composition was mixed for about 5 minutes and then sealed in a container without a filtration step.

Carbon black pigmented inkjet Inks K-C through K-L were prepared in 15-kg quantities by combining the specified amount of Surfynol 440 and/or Surfynol DF-110L with Ink Base K-B as reported in Table 4 in a 30-L container by individually adding the surfactant(s) to the stirred inkjet Ink Base solution at ambient temperature. The ink was mixed for about 60 minutes, and then filtered as described above.

In a typical procedure, the solution pH and conductivity was then measured at ambient conditions using calibrated metering instruments, and electronically compensated to 25° C. Representative ion probes are the Mettler Toledo InLab®

413 pH electrode, No. 52000106, and the Corning Laboratory Conductivity Electrode, No. 476501, available in the Nova Analytics Pinnacle Series. Since the inkjet ink compositions were essentially identical to within about 1%, except for the type and level of the non-ionic surfactants, the basic fluid and electrical properties of the inks were the same within the margin of error of the measurement. Representative properties for inks K-C through K-L were as follows: volume distribution median ($50^{th}$ percentile) particle size diameter, ca. 59 nm; volume distribution $95^{th}$ percentile particle size diameter, ca. 105 nm; pH, 8.70-8.80; ionic electrical conductivity, 4.28-4.39 mS/cm; density, 1.036-1.038 g/cm$^3$; viscosity, 1.45-1.49 mPa-s.

Carbon black pigmented inkjet Inks K-M through K-V were prepared in 15-kg quantities by combining the amount of Surfynol 440 and/or Surfynol DF-110L with Ink Base K-W as reported in Table 5 in a 30-L container by individually adding the surfactant(s) to the stirred Ink Base solution at ambient temperature. The ink was mixed for about 60 minutes, and then filtered as described above.

Since the inkjet ink compositions were essentially identical to within about 1%, except for the type and level of the non-ionic surface modifying agents, the basic fluid and electrical properties of the inks were the same within the margin of error of the measurement. Representative properties for inks K-M through K-V were as follows: volume distribution median ($50^{th}$ percentile) particle size diameter, ca. 59 nm; volume distribution $95^{th}$ percentile particle size diameter, ca. 105 nm; pH, 8.57-8.61; ionic electrical conductivity, 4.08-4.14 mS/cm; density, 1.050 g/cm$^3$; viscosity, 1.70-1.75 mPa-s.

Comparative PhotoBlack Ink K-X of the prior art (high level humectant DOD formulation, with small molecule surfactant dispersed pigment), described in Example Bkl-1 in U.S. Patent Application No. 2008/0207805A1, was prepared from 1.63% of PK-7 carbon black, 0.38% of PB15:3 pigment and 0.5% of PR122 pigment each individually dispersed using potassium oleylmethyltaurate (KOMT) surfactant similarly as described in U.S. Pat. No. 5,679,138; U.S. Pat. No. 5,651,813; U.S. Pat. No. 5,985,017, or U.S. Pat. No. 6,866,379 B2, 8.0% glycerol, 4.0% ethylene glycol, 0.41% Strodex® PK-90 anionic phosphate ester surfactant, 0.9% of acrylic acid co-polymer Polymeric Additive P-3, 1.2% of a polycarbonate-polyurethane co-polymer with acid number 76 and Mw~26,000 daltons, 0.05% triethanolamine and 0.02% Kordek® MLX biocide with the balance as water. This ink exhibited a pH of 8.63; an electrical conductivity of 2.50 mS/cm; a viscosity of 1.64 mPa-s; density of 1.0386 g/cm$^3$; a static surface tension of 34.3 mN/m; and a 10-ms surface tension of about 46.5 mN/m.

Example Black pigmented Ink K-Y (low humectant level CU formulation, with self-dispersed pigment) was comprised of the following components: 5.0 wt % of anionically surface-modified, self-dispersed carbon black pigment, IJX2296ATM batch number 10242-42, that was provided by Cabot Corp; 5.0 wt % of humectant ethylene glycol, 0.03 wt % of acetic acid to adjust ink pH, 0.1 wt % of Proxel® GXL biocide, 0.1 wt % of Cobratec® TT-50S metal corrosion inhibitor, and 0.33 wt % of surfactant sodium dodecyl sulfate (CASRN 151-21-3). The pigment particles in this ink showed a volume-weighted $50^{th}$ percentile particle size of about 55 nm and $95^{th}$ percentile particle size of about 110 nm. This ink exhibited a pH of 8.5; a conductivity of 1.17 mPa-s; a viscosity of 1.212 mPa-s; a density of 1.029 g/cm$^3$; a static surface tension of 37.1 mN/m; and a 10-ms surface tension of about 44.7 mN/m.

CIJ Fluid Recirculating Filtration Stability Test

In order to assess the suitability of a example black pigment inks of the invention for use in CIJ printing on a test stand, ink colloidal stability to fluid pumping and recirculating filtration were examined, as described broadly in U.S. Patent Application No. 2011/0123714 A1 to Yau et al., and in U.S. Patent Application No. 2011/0122180 A1 to Cook et al.

A bench top laboratory apparatus was fabricated to pump fluid from a small source reservoir through a fluid path containing an in-line filter membrane holder, a flow meter with a digital gauge and output capability, and a pressure transducer with digital gauge and output capability to monitor the pressure drop across the filter membrane holder, and then return the filtered fluid to the source reservoir at ambient temperature. A control system maintained either the chosen flow rate or chosen pressure drop value and recorded both the pressure drop and fluid flow rate as a function of time. The volume of ink required to fill the system (about 0.15 L) was minimized in order to maximize the destabilization effect for a given pump at a given flow rate. The fluid recirculation loop made use of tubing with about ¼" internal diameter capable of withstanding high pressure between the pump and filter membrane. The apparatus was fitted with the same model of pump, a Micropump Inc. Micropump® GJ-N23 DB380A cavity style, magnetically coupled gear pump, which is used in the fluid system of commercial inkjet printing presses such as the KODAK PROSPER Press 1000 and which is capable of sustaining a maximum pressure drop of about 100 psid.

In a typical recirculating filtration experiment, the fluid system of the clean apparatus was purged of the final rinsing solution by evacuation under vacuum. A Millipore Corp. in-line 47-mm filter membrane holder was fitted with a Meissner Filtration Products, Inc., 47-mm disc of 0.8 micrometer nominal pore size ALpHA® polypropylene fiber filter media, MF0.8-047-00. The filter holder assembly was inserted into the fluid path using stainless steel fittings. The ink reservoir was charged with 0.12 L of ink, and the pump was gently primed. The automated control and recording computer system was initiated, and the unit ramped slowly to sustain a fluid flow rate of 0.125 L/min, with a typical starting pressure drop of about 4-8 psid. The ink reservoir was topped off after the fluid line and filter holder filled with ink, and the system recorded data for about 45 h. The experiment was then terminated; the recirculated ink fluid was recovered; and the system was flushed with copious quantities of cleaning and final rinse fluids.

CU formulation inkjet inks K-A and K-Y, and comparative DOD formulation ink K-X were tested for ink recirculation stability. CIJ formulation inks K-A and K-Y both showed a pressure growth rate of about 0.02-0.03 psid/h over the 45 h test; most of the pressure growth occurred just after start-up. After the system stabilized, the CIJ formulation inks showed essentially no further pressure growth over the final 60% of the test duration. Comparative DOD formulation ink K-X was unstable to recirculating filtration and showed steady, linear pressure growth at a rate of increase of 0.23 psid/h over the duration of the 45-h test, which is maximally a 10-fold higher filter blocking rate than the example inks. The recovered filter membrane from ink K-X was washed with copious volumes of high purity water, and was found to be heavily stained with black, suggesting the trapping of aggregated colorant pigment particles in the blocked pores. In contrast, the recovered membrane of ink K-A rinsed clean with only a faint stain. Despite the inclusion in ink K-X of poorly adsorbing or non-adsorbing solution polymers, such as Polymer Additive P-3 and an inkjet polyurethane, the small molecule amphiphilic, electrosteric surfactant stabilizer dispersant was ineffective and adequate CIJ fluid recirculation stability was not provided. Similar recirculation stable performance is demonstrated for CIJ formulation inks K-B to K-V as is observed for inks K-A and K-Y.

Magenta Pigmented Inks

Inventive magenta ink M-A was prepared in a process analogous to black pigmented ink K-A. Ink M-A was comprised of: 3.8 wt % Cromophtal® Jet Magenta MC pigment derived from dispersion MD-1; 0.2 wt % of Tetronic® 904 (BASF Corp.) stabilizing and surface active polymer; 4.0 wt % of an aqueous solution of 1.7 moles/kg acetic acid and 2.24 moles/kg N,N-dimethylethanol amine (CASRN 108-01-0) pH buffer and electrical conductivity modifier; 5.0 wt % glycerol humectant; 0.1 wt % of Cobratec® TT-50S metal corrosion inhibitor, 0.1 wt % of Proxel® GXL biocide, 0.06 wt % of Surfynol® 440 surfactant, and 0.20 wt % of Surfynol® DF-110L antifoamant with the balance as high purity water. The pigment particles in this ink showed a volume-weighted $50^{th}$ percentile particle size of 13 nm and $95^{th}$ percentile particle size of 61 nm. This ink exhibited a pH of about 8.9, an electrical conductivity of 4.27 mS/cm, a viscosity of 1.47 mPa-s, a density of 1.027 g/cm$^3$, static surface tension of 40.0 mN/m, and a 10-ms surface tension of 52.6 mN/m.

Inventive magenta ink M-B was similarly prepared in a process analogous to black pigmented ink K-A. Ink M-B was comprised of: 3.8 wt % Cromophtal® Jet Magenta 2BC pigment derived from dispersion MD-1; 0.2 wt % of Tetronic® 904 (BASF Corp.) stabilizing and surface active polymer; 4.0 wt % of an aqueous solution of 1.7 moles/kg acetic acid and 2.24 moles/kg N,N-dimethylethanol amine (CASRN 108-01-0) pH buffer and electrical conductivity modifier; 5.0 wt % glycerol humectant; 0.1 wt % of Cobratec® TT-50S metal corrosion inhibitor, 0.1 wt % of Proxel® GXL biocide, 0.18 wt % of Surfynol® 440 surfactant, and 0.10 wt % of Surfynol® DF-110L antifoamant with the balance as high purity water. The pigment particles in this ink showed a volume-weighted $50^{th}$ percentile particle size of 13 nm and $95^{th}$ percentile particle size of 61 nm. This ink exhibited a pH of about 8.9, an electrical conductivity of 4.27 mS/cm, a viscosity of 1.43 mPa-s, a density of 1.029 g/cm$^3$, static surface tension 38.4 mN/m, and a 10-ms surface tension of 46.3 mN/m.

Cyan Pigmented Inks

Cyan pigmented continuous inkjet ink compositions Ink C-A through C-H were prepared in processes from the pigment dispersions CD-1 or CD-2 by combining the ingredients at the relative proportions reported in Table 2 in a manner analogous to that described for the black pigmented ink K-A. Since the inkjet ink compositions of inks C-C, C-E, C-F, and C-H were essentially identical compositions to within about 1 wt %, except for the type and level of the surface modifying agents, the basic fluid and electrical properties of the inks were about the same within the margin of error of the measurement. Representative properties for these inks were as follows: volume distribution median ($50^{th}$ percentile) particle size diameter, ca. 44 nm; volume distribution $95^{th}$ percentile particle size diameter, ca. 90 nm; pH, about 8.6; ionic electrical conductivity, about 4.0 mS/cm; density, 1.021 g/cm$^3$; and viscosity, 1.32 mPa-s.

Yellow Pigmented Ink

Inventive yellow ink Y-A was comprised of 3.0 wt % PY-74 pigment derived from dispersion YD-1; 0.7 wt % of stabilizer Polymeric Additive P-4 and 3.0 wt % of stabilizer poly(ethylene glycol) with average molecular weight of 400 daltons; 3.0 wt % of humectant triethylene glycol; 0.1 wt % of Cobratec® TT-50S metal corrosion inhibitor, 0.18 wt % of Proxel® GXL biocide, 0.05 wt % of Kordek™ MLX biocide 0.08 wt % of Surfynol® 440 surfactant, and 0.20 wt % of Surfynol® DF-110L antifoamant with the balance as high purity water. The pigment particles in this ink showed a volume-weighted $50^{th}$ percentile particle size of 12 nm and $95^{th}$ percentile particle size of 24 nm. This ink exhibited a pH of about 8.6, an electrical conductivity of 2.17 mS/cm, a viscosity of 1.51 mPa-s, a density of 1.020 g/cm$^3$, static surface tension 37.2 mN/m, and a 10-ms surface tension of 50.2 mN/m.

Continuous Inkjet Printing of Ink Compositions

The ink reservoir of a continuous inkjet test stand jetting fixture was sequentially charged with each continuous inkjet ink composition, and flushing and purging for two or three cycles was carried out to ensure new ink purity. The fixture consisted of the following elements: (1) a fluid system capable of (a) pressurizing the ink in excess of 60 psid thereby producing ink volumetric flow rates of up to about 2 L/min; (b) delivering pressurized ink to a continuous inkjet printhead drop generator; (c) returning unprinted ink under vacuum to the fluid system ink reservoir; (d) detecting the ink reservoir ink concentration by electrical resistivity measurement and replenishing the ink with a replenisher fluid if concentrated by water evaporation and adding more ink to the reservoir instead when it was depleted but at the correct ink concentration; (2) a vacuum drum capable of supporting a sheet of paper and spinning it continuously at precise speeds synchronized with control unit to simulate paper web transport; (3) a continuous inkjet printhead using (a) a KODAK PROSPER Press Jetting Module with a MEMS silicon-based drop generator to form drops of ink and a Coanda gutter to catch non-printing drops when the printer is not printing an image file or when it is not printing a given pixel even if it is printing an image file; (b) an air deflection zone intersecting the drop curtain provided by positive and negative air duct assemblies and (c) an ink return line to the ink reservoir, and (4) a print controller that (a) controls the printing drum speed and synchronizes the drum location in accord with the data feed to the jetting module and also (b) transmits electrical signals to the jetting module CMOS circuitry that renders a raster processed image into pixel by pixel ink stream stimulation instructions using nozzleplate heater pulse patterns by optimized waveforms to generate non-printing catch drops and printing drops of ink delivered at the printing substrate surface pixel location as required.

The fluid system used a Micropump Inc. Micropump® series GJ-N23 DB380A gear pump to deliver the ink fluid through a Meissner Filtration Products Inc. capsule filter CSMK0.8-442 containing ALpHA 0.8 µm nominal polypropylene filter media at about 65 psid pressure drop, which generated a uniform drop velocity of about 20 m/s. The fluid system gear pump speed setting was continually adjusted to provide and maintain constant fluid pressure at the jetting module to uniformly produce the desired drop velocity as per the system specification. The deflected nonprinting ink drops were caught on a Coanda gutter and returned to the fluid system ink tank under vacuum. Sustained operation of the printer in non-printing, drop catch mode resulted in gradual evaporation of the aqueous ink solvent vehicle. Ink concentration was maintained to within about 5% of the original ink concentration by addition of aqueous replenisher fluid to the ink, if it became more than about 5% concentrated based on an ink electrical resistivity determination. Test targets were raster image processed to produce digital printing signal instructions for each pixel location at the appropriate transport speed of the test substrate at 600×900 pixels per inch (ppi) addressability, for speeds up to about 650 FPM, or at 600×600 ppi for speeds up to about 1,000 FPM. NewPage Sterling Ultra Gloss paper was loaded on to the constant speed, rotating drum, which was synchronized with the print data controller. Various test images were printed at different substrate transport speeds that profiled system functional printing speed capability using a 600-nozzles per inch PROSPER Press Jetting Module in a near-production print-head assembly configuration, which produced a 4.25-inch jet curtain print swath. Each printed target image was evaluated for dark defect (DD) indicating the undesired delivery of significant numbers of non-printing drops to the substrate in excess of background errors (typically <5 non-printing drops per square inch), and for pick-out defect (PO) indicating the undesired removal of a printing drop, which left an unmarked pixel on the printed image. The volumetric air flow (e.g., cubic feet per minute) across the space intersected by the jet curtain in the air deflection zone between the positive and negative duct assemblies was conveniently characterized by air pressure differentials (e.g., inches of water) using a Venturi effect measurement tube or a pitot tube. In a stepwise fashion, the air flow rate was adjusted, a print was made, and the DD and PO defect levels were assessed. The lowest air flow threshold for absence of DD formed one boundary of the operating margin, and the highest air flow without PO formed the other boundary. Certain target images were better for assessing DD and others for PO.

Black Ink Printing

Table 3 illustrates the print speed dependence of operating margin for reference ink K-A and example ink K-F, which have different 10-ms dynamic surface tensions, using 600×900 addressability. At 100 FPM, both inks show well differentiated airflow setting conditions for the onset of DD and PO failure modes, and provide serviceable print margin operating windows. At 400 FPM, both inks show similar airflow settings for the onset of DD defect, but the airflow setting for the onset of PO defect is reduced, diminishing the operating margin similarly for both inks. At 600 FPM, however, the airflow setting for the onset of PO defect for reference ink K-A is lower than the airflow setting required to eliminate DD defect, and there is no operating margin to print defect free whatsoever. Example ink K-F, in contrast, still shows a positive net margin. In this printing example, both the "V-line Bow" Target (a vertical line target image containing alternating single pixel lines separated by one pixel in blocks, patterns and shapes) and the "Customer" Target (FIG. 4) gave very similar results for both inks, although the former was more useful to observers judging DD defect (small drops striking the substrate noticeably fill the vertical line white space) and the latter was more useful to print observers judging PO print defects (a missing portion of a regular geometric pattern is readily observed).

Table 4 shows the surfactant content of ink compositions K-A through K-L and reports the resulting static and dynamic 10-ms surface tensions that result. In addition, Table 4 indicates the relative print margin that is obtained using the customer target for this group of inks at 650 FPM printing speed. Airflow settings for inks K-A through K-C could not be established that would allow defect free printing, and the tabulated print margin values were all negative, indicating that an operating window did not exist. Ink K-D exhibiting a 10-ms dynamic surface tension value of 53.5 mN/m produced defect free prints, at a single identified air flow setting. Inks K-E through K-L exhibiting 10-ms dynamic surface tension values less than about 54 mN/m all produced usable, positive airflow operating windows, and produced defect-free prints.

Table 5 demonstrates the operating margin dependence on 10-ms dynamic surface tension for reference ink K-M and example inks K-N through K-V, using 600×600 addressability and substrate transport speed of 1,000 FPM. In this printing experiment, it was desired to rigorously test the correlation of print margin with printing defects by using a target image referred to as Logo Target (a black and white target with flowing shapes resembling bold logographic Asian writing characters) that showed extraordinarily high sensitivity to generating PO defects. The quality of the printed image is also noted. It was observed that comparative ink K-M with a 10-ms dynamic surface tension of 56.0 mN/m showed no net operating margin and extreme PO defect under all air deflection volumetric flow rates in this very high speed printing mode using a most demanding image target. Example inks K-N through K-V all having 10-ms dynamic surface tension of less than about 54 mN/m each showed large gains in printed image quality relative to the reference, and in most cases significant levels of operating margin. In many cases, DD and PO defects were eliminated entirely over the full operating window, and in a few cases, generally modest PO defects remained after substantial amelioration, especially when the 10-ms dynamic surface tension exceeded about 42 mN/m.

Cyan Ink Printing

Table 6 shows print quality dependence related to operating margin levels on 10-ms dynamic surface tension for reference cyan inks C-A through C-E and example inks C-F through C-H, using 600×600 addressability and substrate transport speed of 1,000 FPM. Surfactant types and levels were both varied simultaneously. When 10-ms dynamic surface tension exceeded 54 mN/m, and including the normal margin for experimental variability (in excess of at least 0.5 mN/m, absent significant levels of replication), test stand printing conditions could not be established to produce prints without either DD or PO, as evidenced by comparative controls C-A through C-D. Around measured 10-ms dynamic surface tensions of 54 mN/m, ink C-E printed with defects, while ink C-F exhibited positive operating margin. Inks C-G and C-H with 10-ms dynamic surface tension less than about 50 mN/m both produce defect free prints indicative of useful print margin. It is observed that static surface tension could not be relied on to predict print margin, as ink C-D employed surfactants that strongly reduced static surface tension and high surface age dynamic surface tension, but did not modify the ink fluid properties successfully so as to avoid PO defect.

Full Color Pigmented Inkjet Ink Set Printing

A KODAK PROSPER 5000 Press is a full color continuous inkjet press using PROSPER Press Jetting Modules with a MEMS silicon-based drop generator at 600 nozzles per inch orifice density that provides 4-over-4 perfecting with a print width of up to 24.5 inches (62.2 cm) at speeds up to 650 feet per minute (200 mpm), with image quality produced by 600×900 dpi addressability that is comparable to up to 175 lines per inch offset press quality. It is a highly productive inkjet web press suitable for 8, 12 and 16 page signatures, with a duty cycle of 120 million A4 or US letter pages a month. The individual cyan, magenta yellow and black fluid systems ink tank reservoirs of the above press were each charged with the appropriate color or black pigmented ink (example ink C-H, example ink M-A, example ink Y-A and example ink K-E, respectively) with properties described in Table 7. All pigmented inks exhibited median particles sizes of less than 0.1 micrometers (less than 100 nm), and $95^{th}$ percentile volume weighted particle size distributions of less than about 0.13 micrometers (130 nm). The total sum of humectant and organic co-solvents for each ink was less than 10 wt %. These low loadings of humectant and organic co-solvent resulted in desirably low fluid viscosities of less than about 2.0 mPa-s that reduce the necessary fluid system pressures to produce the required drop velocity for printing (greater than about 15 m/s, and less than about 25 m/s). The surfactant selections for the individual inks are identified in Table 7 along with the resultant static and 10-ms dynamic surface tensions. The 10-ms dynamic surface tensions were equal to or less than about 50 mN/m for each of inks C-H, Y-A, and K-E, and the static surface tension was not a reliable predictor of the 10-ms dynamic surface tension. The air flow settings of the individual jetting modules of each of the eight individual lineheads of the duplex inkjet press were adjusted to minimize DD and PO defects either during jetting module fabrication or by tuning of the linehead print assemblies themselves. The press transport speed was gradually ramped from 40 FPM to 650 FPM, and printed image samples were recovered for analysis. It was determined by careful inspection that the press was able to print the Customer Target image (FIG. 4) successfully at all speeds without printing defects attributable to the absence of serviceable operating print margin. The operating margin of the magenta printing linehead of jetting modules is desirably further enlarged by changeover to example ink M-B, to also provide a 10-ms dynamic surface tension for the magenta ink that is also equal to or less than about 50 mN/m.

The invention has been described in detail with particular reference to certain preferred embodiments thereof, but it will be understood that variations and modifications can be effected within the scope of the invention. For example, the invention has been described for use in a continuous ink jet printer system that employs a gas flow drop deflection mechanism, thermal drop stimulation devices, and nozzle plates fabricated out of silicon. However, the invention can also be employed in continuous ink jet printer systems that use electrostatic drop deflection mechanisms, pressure modulation or vibrating body stimulation devices, and nozzles plates fabricated out of other types of materials. Electrostatic deflection can be of the type that includes separate drop charging and drop deflection electrodes or can be of the type that incorporates both functions in a single electrode.

TABLE 1

Continuous InkJet Black Pigmented Ink Compositions

| Functional Component | Ingredient | Ink K-A (Wt %) | Ink Base K-B (Wt %) | Ink Base K-W (Wt %) |
|---|---|---|---|---|
| Vehicle | Water | 45 | 47 | 28 |
| Pigment Dispersion | KD-1 | 45 | 45 | 55 |
| Soluble Dye Colorant | Direct Black 19 Solution SF (17 w/w % Direct Black 19, Sensient Colors, Inc.) | 1.2 | 1.2 | 8.8 |
| Humectant | Glycerine | 4.5 | 4.5 | 6.0 |
| Amine Salt | Salt of N-methyldiethanolamine and acetic acid (15 w/w % acetic acid) | 2.7 | 2.7 | 1.7 |
| Base | N-Methyldiethanolamine | 0.8 | 0.8 | 0.3 |
| Biocide | PROXEL ® GXL (Arch Chemicals, Inc.) | 0.1 | 0.1 | 0.1 |
| Nickel Metal Corrosion Inhibitor | COBRATEC ® TT-50S (PMC Specialties Group, Inc.) | 0.1 | 0.1 | 0.1 |
| Surfactant | SURFYNOL ® 440 (Air Products and Chemicals, Inc.) | 0.06 | 0.00 | 0.00 |
| Antifoamant | SURFYNOL ® DF-110L (Air Products and Chemicals, Inc.) | 0.08 | 0.00 | 0.00 |

TABLE 2

Continuous Inkjet Cyan Pigmented Ink Compositions

| Functional Component | Ingredient | Ink C-A (Wt %) | Ink C-B (Wt %) | Ink C-C (Wt %) | Ink C-D (Wt %) | Ink C-E (Wt %) | Ink C-F (Wt %) | Ink C-G (Wt %) | Ink C-H (Wt %) |
|---|---|---|---|---|---|---|---|---|---|
| Vehicle | Water | 66 | 72 | 74 | 72 | 74 | 74 | 73 | 73 |
| Pigment Dispersion | CD-1 | 25 | | | | | | | |
| | CD-2 | | 20 | 20 | 20 | 20 | 20 | 20 | 20 |
| Stabilizer | Luvitec K17 PVP (BASF Corp.) | | 0.5 | 0.5 | | 0.5 | 0.5 | 0.5 | 0.5 |
| | Zetasperse 1600 (Air Products and Chemicals) | | | | | | | 0.80 | |
| | Polymer P1 | 2.3 | | | | | | | |
| Humectant | Glycerine | 5.0 | 6.0 | 4.0 | 6.0 | 4.0 | 4.0 | 4.0 | 4.0 |
| Amine Salt | N-methyldiethanolamine/acetic acid Salt (15 w/w % acetic acid) | | | | | | | | 1.8 |
| Acid | Acetic Acid | 0.3 | 0.3 | 0.3 | 0.3 | 0.3 | 0.3 | 0.3 | |
| Base | N-Methyldiethanolamine | 1.0 | 0.9 | 0.9 | 0.9 | 0.9 | 0.9 | 0.9 | 0.3 |
| Biocide | PROXEL ® GXL (Arch Chemicals, Inc.) | 0.1 | 0.1 | 0.1 | 0.1 | 0.1 | 0.1 | 0.1 | 0.1 |
| Corrosion Inhibitor | COBRATEC ® TT-50S (PMC Specialties Group, Inc.) | 0.1 | 0.1 | 0.1 | 0.1 | 0.1 | 0.1 | 0.1 | 0.1 |
| Surfactant | SURFYNOL ® 440 | | | | | | | | 0.10 |
| | SURFYNOL ® 465 (Air Products and Chemicals) | | | | | 0.10 | | | |
| | TETRONIC ® 904 | | | | | | | | 0.40 |

TABLE 2-continued

Continuous Inkjet Cyan Pigmented Ink Compositions

| Functional Component | Ingredient | Ink C-A (Wt %) | Ink C-B (Wt %) | Ink C-C (Wt %) | Ink C-D (Wt %) | Ink C-E (Wt %) | Ink C-F (Wt %) | Ink C-G (Wt %) | Ink C-H (Wt %) |
|---|---|---|---|---|---|---|---|---|---|
| | (BASF Corp.) ZONYL ® XL (DuPont) | | | | | 0.50 | | | |
| | OLIN 10G (Olin Corp.) | | | | 0.10 | | | | |
| Antifoamant | SURFYNOL ® DF-110L | 0.04 | 0.10 | 0.10 | 0.10 | 0.10 | 0.10 | 0.10 | 0.10 |

TABLE 3

Black Pigment Ink, 600 × 900 Addressability Print Margin Dependence on Printing Speed

| | | 10-ms | | V-line Bow Target | | | Customer Target | | |
|---|---|---|---|---|---|---|---|---|---|
| Entry | Ink | Dynamic Surface Tension (mN/m) | Speed (FPM) | DD Onset Pressure (in. of water) | PO Onset Pressure (in. of water) | Print Margin (in. of water) | DD Onset Pressure (in. of water) | PO Onset Pressure (in. of water) | Print Margin (in. of water) |
| 1a. (c) | K-A | 57.8 | 100 | 1.16 | 1.42 | 0.26 | 1.12 | 1.42 | 0.30 |
| 1b. (c) | K-A | 57.8 | 400 | 1.20 | 1.36 | 0.16 | 1.12 | 1.26 | 0.14 |
| 1c. (c) | K-A | 57.8 | 650 | 1.18 | 1.30 | 0.12 | 1.08 | 1.06 | −0.02 |
| 2a. (e) | K-F | 48.2 | 100 | 1.14 | 1.42 | 0.28 | 1.10 | 1.42 | 0.28 |
| 2b. (e) | K-F | 48.2 | 400 | 1.20 | 1.38 | 0.18 | 1.10 | 1.28 | 0.18 |
| 2c. (e) | K-F | 48.2 | 650 | 1.16 | 1.26 | 0.10 | 1.06 | 1.14 | 0.08 |

TABLE 4

Black Pigment Ink 650-FPM, 600 × 900 Addressability Print Margin Dependence on Surfactant Selection

| Entry | Ink | Surfynol 440 (wt %) | Surfynol DF-110L (wt %) | Static Surface Tension (mN/m) | 10-ms Dynamic Surface Tension (mN/m) | Customer Target DD Onset Pressure (in. of water) | PO Onset Pressure (in. of water) | Print Margin (in. of water) | Print without DD or PO Errors? |
|---|---|---|---|---|---|---|---|---|---|
| 1. (c) | K-A | 0.060 | 0.080 | 40.2 | 57.8 | 1.08 | 1.06 | −0.02 | No |
| 2. (c) | K-B | 0.000 | 0.000 | 54.4 | 66.0 | 1.12 | 0.94 | −0.18 | No |
| 3. (c) | K-C | 0.000 | 0.050 | 46.9 | 63.3 | 1.08 | 0.90 | −0.18 | No |
| 4. (e) | K-D | 0.000 | 0.425 | 36.8 | 53.5 | 1.06 | 1.06 | 0.00 | Yes |
| 5. (e) | K-E | 0.175 | 0.000 | 38.7 | 46.5 | 1.06 | 1.20 | 0.14 | Yes |
| 6. (e) | K-F | 0.060 | 0.550 | 34.2 | 48.2 | 1.06 | 1.14 | 0.08 | Yes |
| 7. (e) | K-G | 0.000 | 0.800 | 33.0 | 45.4 | 1.06 | 1.16 | 0.10 | Yes |
| 8. (e) | K-H | 0.230 | 0.080 | 35.8 | 43.8 | 1.08 | 1.16 | 0.08 | Yes |
| 9. (e) | K-I | 0.350 | 0.050 | 34.0 | 41.0 | 1.06 | 1.20 | 0.14 | Yes |
| 10. (e) | K-J | 0.245 | 0.500 | 31.7 | 39.4 | 1.06 | 1.20 | 0.14 | Yes |
| 11. (e) | K-K | 0.350 | 0.800 | 28.9 | 36.0 | 1.08 | 1.14 | 0.06 | Yes |
| 12. (e) | K-L | 0.422 | 0.425 | 30.4 | 35.9 | 1.06 | 1.12 | 0.06 | Yes |

TABLE 5

Black Pigment Ink 1,000-FPM, 600 × 600 Addressability Print Margin Dependence on Surfactant Selection

| Entry | Ink | Surfynol 440 (wt %) | Surfynol DF-110L (wt %) | Static Surface Tension (mN/m) | 10-ms Dynamic Surface Tension (mN/m) | Logo Target DD Onset Pressure (in. of water) | PO Onset Pressure (in. of water) | Print Margin (in. of water) | Print Image DD or PO Errors |
|---|---|---|---|---|---|---|---|---|---|
| 1. (c) | K-M | 0.060 | 0.080 | 40.9 | 56.0 | −0.93 | Unable | 0 | Extreme pickout |
| 2. (e) | K-N | 0.175 | 0.000 | 38.1 | 47.7 | −0.92 | Unable | 0 | Some PO |

TABLE 5-continued

Black Pigment Ink 1,000-FPM, 600 × 600 Addressability Print Margin Dependence on Surfactant Selection

| Entry | Ink | Surfynol 440 (wt %) | Surfynol DF-110L (wt %) | Static Surface Tension (mN/m) | 10-ms Dynamic Surface Tension (mN/m) | DD Onset Pressure (in. of water) | Logo Target PO Onset Pressure (in. of water) | Print Margin (in. of water) | Print Image DD or PO Errors |
|---|---|---|---|---|---|---|---|---|---|
| 3. (e) | K-O | 0.350 | 0.000 | 35.2 | 41.5 | −0.89 | −1.04 | 0.15 | None |
| 4. (e) | K-P | 0.390 | 0.200 | 32.6 | 38.8 | −0.90 | −1.13 | 0.23 | None |
| 5. (e) | K-Q | 0.260 | 0.000 | 36.2 | 43.8 | −0.91 | Unable | 0 | Some PO |
| 6. (e) | K-R | 0.180 | 0.400 | 33.3 | 42.2 | −0.91 | −1.06 | 0.15 | None |
| 7. (e) | K-S | 0.260 | 0.200 | 33.7 | 41.1 | −0.90 | −1.03 | 0.13 | None |
| 8. (e) | K-T | 0.140 | 0.200 | 35.7 | 45.9 | −0.90 | Unable | 0 | Large PO |
| 9. (e) | K-U | 0.260 | 0.500 | 30.3 | 38.4 | −0.90 | −1.19 | 0.29 | None |
| 10 (e) | K-V | 0.350 | 0.400 | 31.1 | 37.6 | −0.91 | −1.19 | 0.28 | None |

TABLE 6

Cyan Pigment Ink 1,000-FPM, 600 × 600 Addressability Print Margin Dependence on Surfactant Selection

| Entry | Ink | Surfactant (s) | Level(s) (wt %) | Static Surface Tension (mN/m) | 29-44 s Dynamic Surface Tension (mN/m) | 10-ms Dynamic Surface Tension (mN/m) | Print without DD or PO Errors? |
|---|---|---|---|---|---|---|---|
| 1. (c) | C-A | Surfynol DF-110L | 0.040 | 48.7 | 48.3 | 63.8 | No |
| 2. (c) | C-B | Surfynol DF-110L | 0.100 | 41.4 | 43.9 | 59.3 | No |
| 3. (c) | C-C | Olin 10G | 0.100 | | 42.9 | 65.9 | No |
| | | Surfynol DF-110L | 0.100 | | | | |
| 4. (c) | C-D | Zonyl XL | 0.500 | 23.4 | 29.9 | 56.8 | No |
| | | Surfynol DF-110L | 0.100 | | | | |
| 5. (c) | C-E | Surfynol 465 | 0.100 | | 40.8 | 53.7 | No |
| | | Surfynol DF-110L | 0.100 | | | | |
| 6. (e) | C-F | Tetronic 904 | 0.400 | 36.1 | 38.3 | 54.4 | Yes |
| | | Surfynol DF-110L | 0.100 | | | | |
| 7. (e) | C-G | Zetasperse 1600 | 0.800 | | 36.1 | 44.3 | Yes |
| | | Surfynol DF-110L | 0.100 | | | | |
| 8. (e) | C-H | Surfynol 440 | 0.100 | 34.6 | 37.1 | 48.3 | Yes |
| | | Surfynol DF-110L | 0.100 | | | | |

TABLE 7

Pigment Ink Set with 650-FPM Print Margin at 600 × 900 Addressability

| Entry | Ink | Pigment Particle 50$^{th}$ % TILE Size (nm) | Total Humectant and Co-solvent (wt %) | Viscosity (mPa-s) | Surfactant (s) | Level(s) (wt %) | Static Surface Tension (mN/m) | 10-ms Dynamic Surface Tension (mN/m) | Print without DD or PO Errors? |
|---|---|---|---|---|---|---|---|---|---|
| 1. (e) | C-H | 31 | 4.5 | 1.32 | Surfynol 440 | 0.100 | 34.6 | 48.3 | Yes |
| | | | | | Surfynol DF-110L | 0.100 | | | |
| 2. (e) | M-A | 13 | 6.4 | 1.43 | Tetronic 904 | 0.200 | 39.6 | 52.6 | Yes |
| | | | | | Surfynol 440 | 0.060 | | | |
| | | | | | Surfynol DF-110L | 0.200 | | | |
| 3. (e) | M-B | 13 | 6.3 | 1.45 | Tetronic 904 | 0.200 | 38.4 | 46.3 | Yes |
| | | | | | Surfynol 440 | 0.180 | | | |
| | | | | | Surfynol DF-110L | 0.100 | | | |
| 4. (e) | Y-A | 12 | 3.8 | 1.54 | Surfynol 440 | 0.080 | 37.2 | 50.3 | Yes |
| | | | | | Surfynol DF-110L | 0.200 | | | |
| 5. (e) | K-E | 57 | 5.6 | 1.40 | Surfynol 440 | 0.175 | 38.4 | 46.5 | Yes |

PARTS LIST 20 continuous printer system
22 image source
24 image processing unit
26 drop forming mechanism control circuits
28 drop forming mechanism
30 printhead
32 recording medium
34 recording medium transport system
36 recording medium transport control system
38 micro-controller
40 reservoir
42 catcher
44 recycling unit
46 pressure regulator
47 channel
48 jetting module
49 nozzle plate
50 nozzles
51 heater
52 liquid filament
54 small non-printing ink drops
56 large printing ink drops
57 trajectory
58 drop stream
60 gas flow deflection mechanism
61 positive pressure gas flow structure
62 gas flow
63 negative pressure gas flow structure
64 deflection zone
66 small drop trajectory
68 large drop trajectory
72 first gas flow duct
74 lower wall
76 upper wall
78 second gas flow duct
82 upper wall
84 seal
86 liquid return duct
88 plate
90 front face
92 positive pressure source
94 negative pressure source
96 wall
100 ink fluid coating the catcher front face
102 pick-out print defect
θ downward angle

The invention claimed is:

1. A method of printing an image with a continuous inkjet printer system comprising:
   providing a jetting module with a plurality of nozzles including a nozzle in fluid communication with a liquid ink source;
   causing liquid ink to be jetted through the nozzle; causing liquid ink drops to be formed from the ink that is jetted through the nozzle by drop stimulation in response to time-varying electrical signals;
   providing a catcher including a liquid drop contact face, using a deflection mechanism to deflect at least some of the liquid ink drops onto the liquid drop contact face of the catcher; and allowing other liquid ink drops to pass by the catcher and deposit onto a print media; and causing the liquid drops that contact the liquid drop contact face to flow along the contact face;
   wherein the liquid ink is an aqueous inkjet black ink comprising a black colorant and at least one amphiphilic surfactant selected to provide dynamic surface tension of less than 54 mN/m at 10-ms.

2. The method of printing an image of claim 1 wherein the at least one amphiphilic surfactant is selected to provide a dynamic surface tension of less than or equal to 50 mN/m at 10-ms.

3. The method of printing an image of claim 1 wherein the ink has a static surface tension of at least 30 mN/m.

4. The method of printing an image of claim 1 wherein the ink is comprised of less than 10 wt % of humectant and co-solvent.

5. The method of printing an image of claim 1 wherein the ink is comprised of less than or equal to 8 wt % of humectant and co-solvent.

6. The method of printing an image of claim 1, wherein the liquid ink comprises dispersed black pigment particles.

7. The inkjet method of printing an image of claim 6 wherein the black pigment particles have a median volume-weighted particle size of less than 90 nm.

8. The method of printing an image of claim 1 wherein the ink has a dynamic viscosity of less than 2.0 mPa-s.

9. The method of printing an image of claim 1 wherein the print media is transported past the jetting module at a speed of greater than 100 FPM while some of the liquid ink drops are deflected onto the liquid drop contact face of the catcher and others are deposited on the print media.

10. The method of printing an image of claim 1 wherein the print media is transported past the jetting module at a speed of greater than 400 FPM while some of the liquid ink drops are deflected onto the liquid drop contact face of the catcher and others are deposited on the print media.

11. The method of printing an image of claim 1 wherein the print media is transported past the jetting module at a speed of greater than 600 FPM while some of the liquid ink drops are deflected onto the liquid drop contact face of the catcher and others are deposited on the print media.

12. The method of printing an image of claim 1 wherein the print media is transported past the jetting module at a system speed that is at least 50% of theoretical capability based on pixel addressability and drop formation frequency while some of the liquid ink drops are deflected onto the liquid drop contact face of the catcher and others are deposited on the print media.

13. The method of printing an image of claim 1 wherein the print media is transported past the jetting module at a system speed that is at least 75% of theoretical capability based on pixel addressability and drop formation frequency while some of the liquid ink drops are deflected onto the liquid drop contact face of the catcher and others are deposited on the print media.

14. The method of printing an image of claim 1 wherein the print media is transported past the jetting module at a system speed that is at least 90% of theoretical capability based on pixel addressability and drop formation frequency while some of the liquid ink drops are deflected onto the liquid drop contact face of the catcher and others are deposited on the print media.

15. The method of printing an image of claim 1 wherein liquid ink drops of at least two different sizes are caused to be formed from the ink that is jetted through the nozzle, smaller liquid drops are deflected a greater distance to contact the liquid drop contact face, and larger liquid drops are deflected a smaller distance to avoid contacting the liquid drop contact face and pass by the catcher to deposit onto the print media.

16. The method of printing an image of claim 15 wherein the deflection mechanism comprises a gas flow drop deflection mechanism.

17. The method of printing an image of claim 1, further comprising:
- providing at least second, third and fourth jetting modules including nozzles in fluid communication with second, third and fourth liquid ink sources, respectively;
- causing each of second, third and fourth liquid inks to be jetted through a nozzle of an associated jetting module;
- causing liquid ink drops to be formed from each of the second, third and fourth inks that are jetted through the nozzles;
- providing a catcher including a liquid drop contact face for each of the second, third and fourth jetting modules;
- using a deflection mechanism to deflect at least some of the liquid ink drops onto the liquid drop contact face of the catcher for each of the second, third and fourth jetting modules; and allowing other liquid ink drops to pass by the catcher for each of the second, third and fourth jetting modules and deposit onto a print media; and
- causing the liquid drops that contact the liquid drop contact face to flow along the contact face for each of the second, third and fourth jetting modules;
- wherein the second, third and fourth liquid inks are aqueous inkjet yellow, magenta and cyan inks, each comprising a colorant and at least one surfactant selected to provide a dynamic surface tension of less than 54 mN/m at 10-ms for each ink.

18. The method of printing an image of claim 17 wherein
- each of the black, the yellow, the magenta, and the cyan inks comprise at least one surfactant is selected to provide a dynamic surface tension of less than or equal to about 50 mN/m at 10-ms for each ink.

19. The method of printing an image of claim 17 wherein each of the black, the yellow, the magenta, and the cyan inks are comprised of less than about 10 wt % of humectant and co-solvent.

20. The method of printing an image of claim 17 wherein the pigment particles in each of the cyan, yellow, magenta, and black inks have a median volume-weighted particle size of less than about 90 nm.

* * * * *